US011202275B1

(12) United States Patent
Kumar et al.

(10) Patent No.: US 11,202,275 B1
(45) Date of Patent: Dec. 14, 2021

(54) METHOD AND APPARATUS FOR POWER AND PROCESSING SAVINGS FOR POSITIONING REFERENCE SIGNALS TRANSMITTED IN BEAMS

(71) Applicant: QUALCOMM Incorporated, San Diego, CA (US)

(72) Inventors: Mukesh Kumar, Dinanagar (IN); Guttorm Ringstad Opshaug, Redwood City, CA (US); Siddhant, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/135,461

(22) Filed: Dec. 28, 2020

(51) Int. Cl.
*H04W 64/00* (2009.01)
*H04L 5/00* (2006.01)
*H04B 17/318* (2015.01)
*H04W 4/02* (2018.01)
*H04L 1/18* (2006.01)
*H04B 7/06* (2006.01)

(52) U.S. Cl.
CPC ........ *H04W 64/003* (2013.01); *H04B 7/0695* (2013.01); *H04B 17/318* (2015.01); *H04L 1/18* (2013.01); *H04L 5/0048* (2013.01); *H04W 4/02* (2013.01)

(58) Field of Classification Search
CPC .......................... H04W 64/00; H04W 64/003
See application file for complete search history.

(56) References Cited

U.S. PATENT DOCUMENTS

2020/0350686 A1* 11/2020 Nemeth, III ........... H01Q 13/24

* cited by examiner

*Primary Examiner* — Kevin Kim
(74) *Attorney, Agent, or Firm* — QUALCOMM Incorporated

(57) ABSTRACT

A mobile device supports positioning with positioning reference signals (PRS) on multiple beam by dividing the PRS processing into two separate modes, an acquisition mode and a tracking mode. In acquisition mode, the mobile device performs a fast scan of all of the beams from a base station transmitting PRS using less than the full set of resources for the PRS, i.e., less than the full bandwidth and/or less than the full number of repetitions of the PRS. The mobile device may select the best beams to use for positioning, e.g., based on signal strength metric. In tracking mode, the mobile device tracks the PRS from only the selected beams using the full set of resources for the PRS. The mobile device may return to acquisition mode after a predetermined number of positioning occasions or if the selected beams are no longer valid due to movement or change in conditions.

30 Claims, 15 Drawing Sheets

Comb-2 with 2 symbols
DL-PRS-ResourceSymbolOffset=3

Comb-2 with 4 symbols

Comb-2 with 6 symbols

Comb-2 with 12 symbols

Comb-4 with 4 symbols

Comb-4 with 12 symbols

Comb-6 with 6 symbols

Comb-6 with 12 symbols

Comb-12 with 12 symbols

METHOD AND APPARATUS FOR POWER AND PROCESSING SAVINGS FOR POSITIONING REFERENCE SIGNALS TRANSMITTED IN BEAMS

BACKGROUND

Field

The subject matter disclosed herein relates to wireless communications systems, and more particularly to methods and apparatuses for position location of a mobile device.

Relevant Background

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). A mobile device acquiring PRSs transmitted by different base stations may deliver signal-based measurements to a location server, which may be part of an Evolved Packet Core (EPC) or 5G Core Network (5GCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT). Alternatively, a mobile device may compute an estimate of its own location using various positioning methods. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

With 5G NR cellular networks, base stations will utilize an array of antenna elements for beamforming. With a large number of antenna elements, beamforming can be used to produce very narrow beams that can be swept horizontally (azimuthally) and vertically (elevation) to form a spatial grid of beams. Implementation of positioning using beam transmissions is progressing, e.g., for UE-based, UE-assisted, positioning techniques, as well as for UI, DL, or UL and DL approaches to estimate Angle of Departure (AoD) and/or Angle of Arrival (AoA) at the gNB. One important consideration is the power and processing required for positioning using PRS received in a plurality of transmitted beams.

SUMMARY

A mobile device supports positioning with positioning reference signals (PRS) on multiple beam by may be dividing the PRS processing into two separate modes, an acquisition mode and a tracking mode. In the acquisition mode, the mobile device performs a fast scan of all of the beams from a base station transmitting PRS using less than the full set of resources for the PRS, i.e., less than the full bandwidth and/or less than the full number of repetitions of the PRS. The mobile device may select the best beams to use for positioning, e.g., based on signal strength metric. In the tracking mode, the mobile device tracks the PRS from only the selected beams using the full set of resources for the PRS. The mobile device may return to acquisition mode after a predetermined number of positioning occasions or if the selected beams are no longer valid due to movement or change in conditions.

In one implementation, a method for supporting positioning of a mobile device in a wireless network performed by the mobile device, includes receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof. The method may include selecting a predetermined number of beams from the plurality of beams. The method may include receiving the PRS from the selected beams using the full set of resources for the PRS produced by each selected beam.

In one implementation, a mobile device configured for supporting positioning of the mobile device in a wireless network, includes a wireless transceiver configured to wirelessly communicate in the wireless network; at least one memory; and at least one processor coupled to the wireless transceiver and the at least one memory. The at least one processor may be configured to receive, using the wireless transceiver, positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof. The at least one processor may be configured to select a predetermined number of beams from the plurality of beams. The at least one processor may be configured to receive, using the wireless transceiver, the PRS from the selected beams using the full set of resources for the PRS produced by each selected beam.

In one implementation, a mobile device configured for supporting positioning of the mobile device in a wireless network, includes means for receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof. The mobile device may include a means for selecting a predetermined number of beams from the plurality of beams. The mobile device may include a means for receiving the PRS from the selected beams using the full set of resources for the PRS produced by each selected beam.

In one implementation, a non-transitory computer readable storage medium including program code stored thereon, the program code is operable to configure at least one processor in a mobile device for supporting positioning of the mobile device in a wireless network, includes program code to receive positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof. The non-transitory computer readable storage medium may include program code to select a predetermined number of beams from the plurality of beams. The non-transitory computer readable storage medium may include program code to receive the PRS from the selected beams using the full set of resources for the PRS produced by each selected beam.

BRIEF DESCRIPTION OF THE DRAWINGS

Elements are indicated by numeric labels in the figures with like numbered elements in different figures representing the same element or similar elements.

Figure 1:
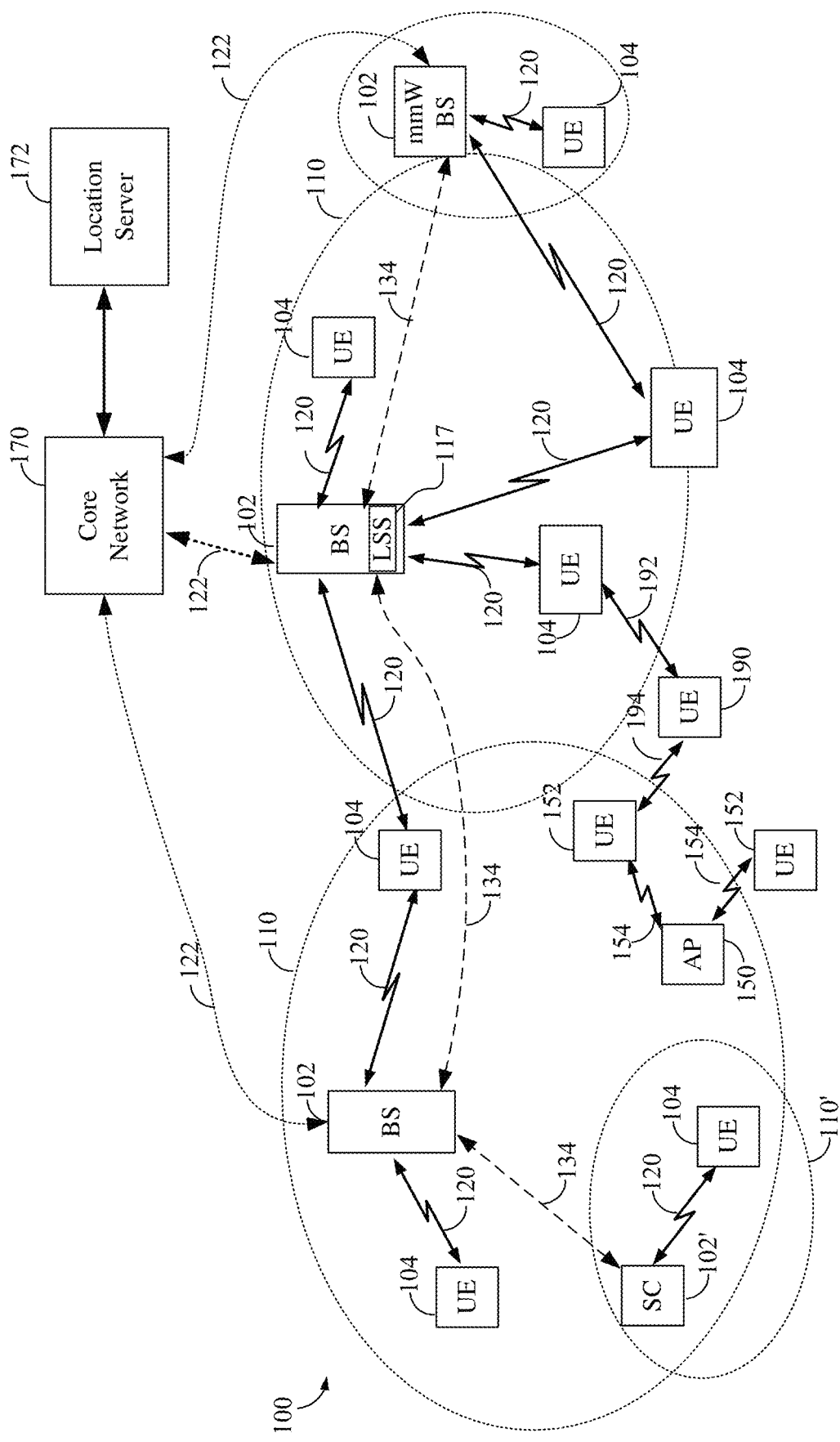
FIG. 1 illustrates an exemplary wireless communications system, according to various aspects of the disclosure.

Different instances of a common element are indicated by following a numeric label for the common element with a distinct numeric suffix. In this case, a reference to the numeric label without a suffix indicates any instance of the common element. For example, FIG. 1 contains four distinct network cells, labelled 110a, 110b, 110c, and 110d. A reference to a cell 110 then corresponds to any of the cells 110a, 110b, 110c, and 110d.

DETAILED DESCRIPTION

The terms "mobile device", "mobile stations" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile device" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile device."

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) new radio (NR) operating in mmWave bands) network.

Beamformed transmissions are expected to be widespread deployed in 5G NR deployments using spectrum under 6 GHz, e.g., sub-6, and mmWave, which operates using a spectrum above 24 GHz. For example, a base station with a large number of antenna elements may beamform to transmit beams in a sets of beams over a range of horizontal (azimuthal) angles and vertical (elevation) angles to form a spatial grid of beams.

A UE may adopt a signaling/report according to a "Time of First Detected"/"Time of Arrival" metric, instead of L1-Reference Signal Received Power (RSRP) metric. Thus, a beam of interest to a UE are the beams from a base station with the first detected channel tap that is the earliest and beams whose first detected channel tap is within a predetermined delay from the first detected tap of the beam with earliest first tap.

In 5G NR a base stations may transmit a downlink (DL) positioning reference signal (PRS) that is processed and measured by a UE for determining a location estimate of the UE. For example, a UE may generate positioning measurements from the DL PRS such as Reference Signal Time Difference (RSTD), Reference Signal Received Power (RSRP), and reception and transmission (RX-TX) time difference measurements, which may be used to determine a location estimate for the UE using various positioning methods, such as Time Difference of Arrival (TDOA), Angle of Departure (AoD), and multi-cell Round Trip Time (RTT). In some implementations, the UE may generate positioning measurements using DL PRS which may be sent to a remote location server to calculate a location estimate for the UE in UE assisted positioning process or the UE may calculate its own location estimate in a UE based positioning process.

In 5G NR, PRS signals have been provided with expanded flexibility with respect to LTE. For example, in 5G NR, PRS may be transmitted with multiple symbol and Comb options per subframe and may be transmitted on multiple subframes, i.e., repeated in the time domain for each positioning occasion. Moreover, multiple beams may transmit each PRS and the beams may be repeated to improve performance. Further, multiple PRS occasions may be used.

The expanded PRS flexibility, however, results in significantly increased power and processing requirements for receiving PRS. Improvements are needed to reduce memory and processing requirement for PRS reception using 5G NR.

Accordingly, in one implementation, positioning of a mobile device may be supported by dividing the PRS processing into two separate modes, e.g., an acquisition mode and a tracking mode. In the acquisition mode, the mobile device performs a fast scan of all of the beams from a base station transmitting PRS using less than the full set of resources for the PRS. For example, the mobile device may acquire the PRS in each beam using less than the full bandwidth of the PRS, less than the full number of repetitions of the PRS, or a combination thereof. Using less than the full set of resources for the PRS for each beam, the mobile device may select a predetermined number of beams to be used in the tracking mode. For example, the mobile device may use signal strength metrics, such as one or more of Signal to Noise Ratio (SNR), Reference Signal Received Power (RSRP), or Reference Signal Received Quality (RSRQ), to select beams to be used in the tracking mode. In tracking mode, the mobile device tracks the PRS from the selected beams using the full set of resources for the PRS produced by each selected beam. The mobile device may perform the desired positioning measurements using the PRS from the selected beams while in tracking mode.

By using less than the full set of resources for the PRS from each beam during the acquisition mode, and using the full set of resources for the PRS only after a reduced number of beams have been selected for tracking, the mobile device may significantly reduce the power and processing requirements needed to process PRS for positioning.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. Location server 172 may be internal or external to the core network 170. In some implementations, the location server 172 may be an E-SMLC in the case of LTE access, a standalone SMLC (SAS) in the case of UMTS access, an SMLC in the case of GSM access, a SUPL Location Platform (SLP), or a Location Management Function (LMF) in the case of 5G NR access. Additionally, or alternatively, the location server may be within the RAN and may be co-located with or part of a serving base station 102, which is sometimes referred to as a Location Server Surrogate (LSS) 117. The LSS 117 may replace the location server 172 or may operate in conjunction with the location server 172, e.g., performing some functions that would be otherwise be performed by location server 172, e.g., to improve latency. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

In 5G, the frequency spectrum in which wireless nodes (e.g., base stations 102, UEs 104) operate is divided into multiple frequency ranges, FR1 (from 4.1 GHz to 7.125 GHz), FR2 (from 24.25 GHz to 52.6 GHz), and FR4 (between 52.6 GHz-114.25 GHz bands). The wireless communications system 100 may further include a millimeter wave (mmW) base station 102, which may be a small cell base station, that may operate in mmW frequencies and/or near mmW frequencies in communication with a UE 104. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 102 and the UE 104 may utilize beamforming (transmit and/or receive) over a mmW communication link 120 to compensate for the extremely high path loss and short range. Further, it will be appreciated that in alternative configurations, one or more base stations 102 may also transmit using mmW or near mmW and beamforming. Moreover, the mmW base station may operate in upper millimeter wave bands) e.g., between 24 GHz to 114 GHz, or some frequency allocation within that range, e.g., 24.25 GHz to 52.6 GHz or other ranges. Alternately, ultra wide bandwidth operation can also be in sub-THz frequencies (beyond either 100 GHz or 275 GHz or 300 GHz depending on how the sub-THz regime is defined). Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102

(e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 102 over a mmW communication link 120. For example, the macro cell base station 102 may support a PCell and one or more SCells for a UE and the mmW base station 102 may support one or more SCells for a UE.

Figure 2A:
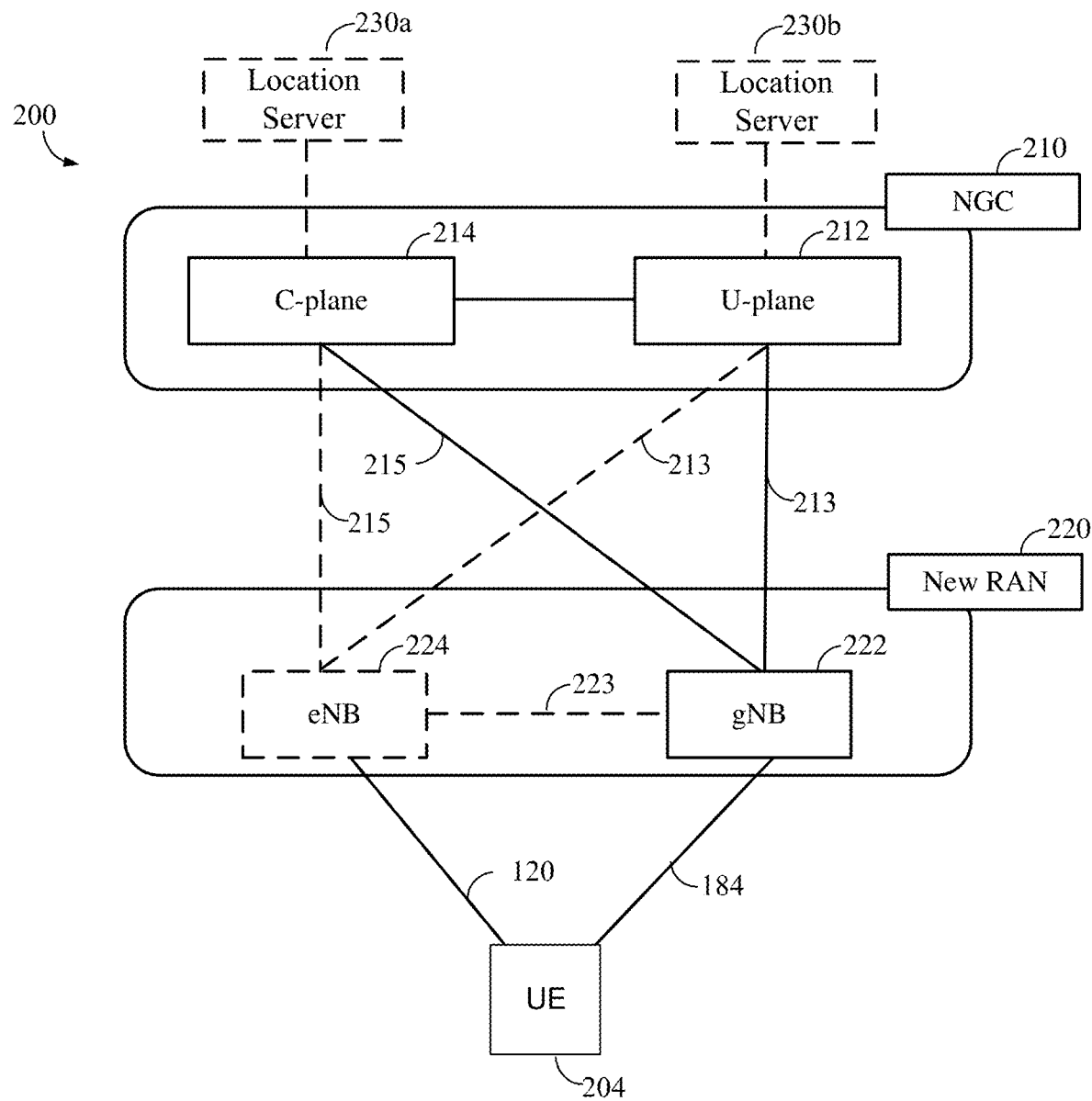
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the RAN 220. Additionally, a Location Server Surrogate (LSS) (such as LSS 117 shown in FIG. 1) may be located in the RAN 220, e.g., co-located with a gNB 222, and may perform one or more location management functions.

Figure 2B:
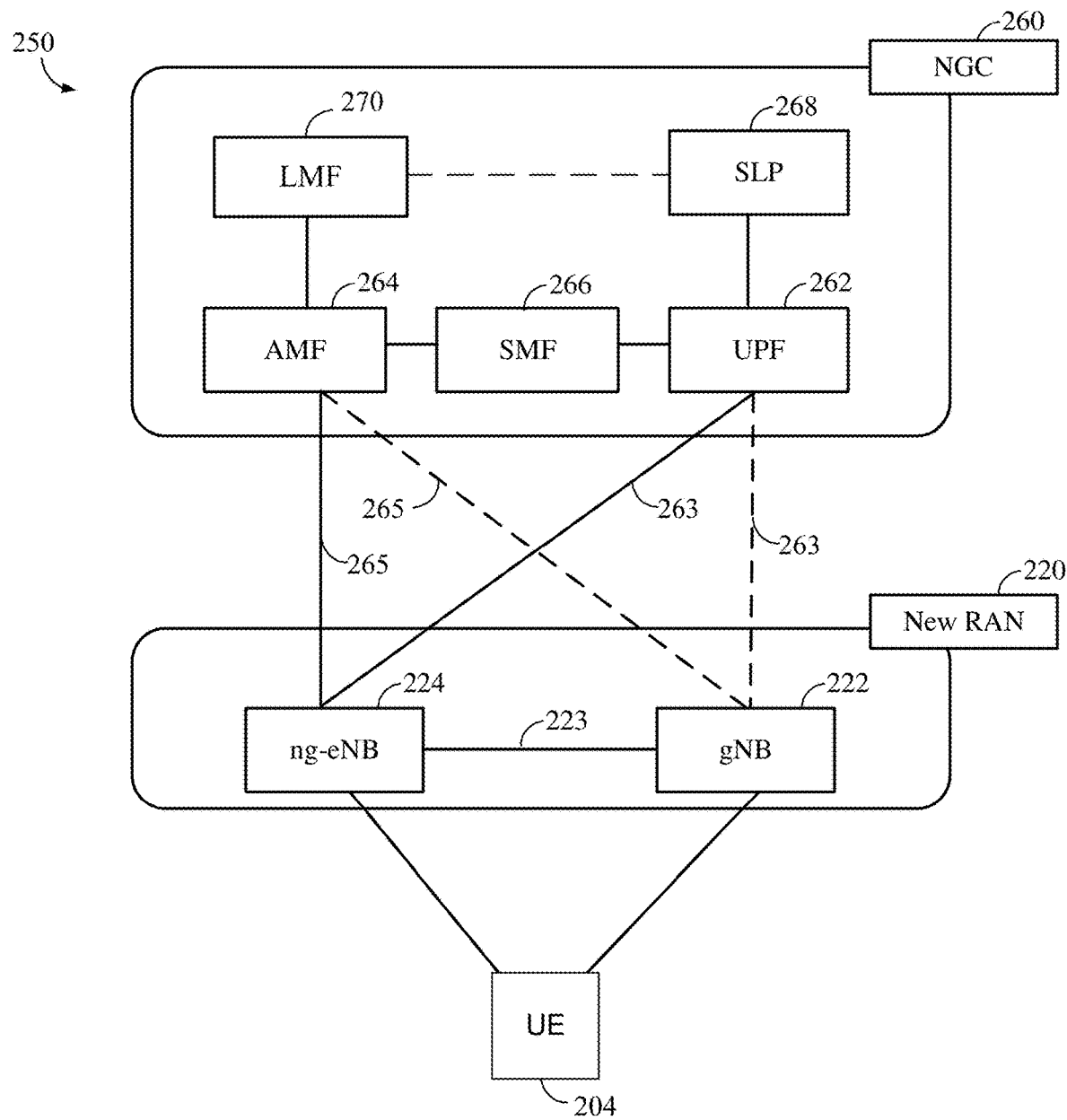

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
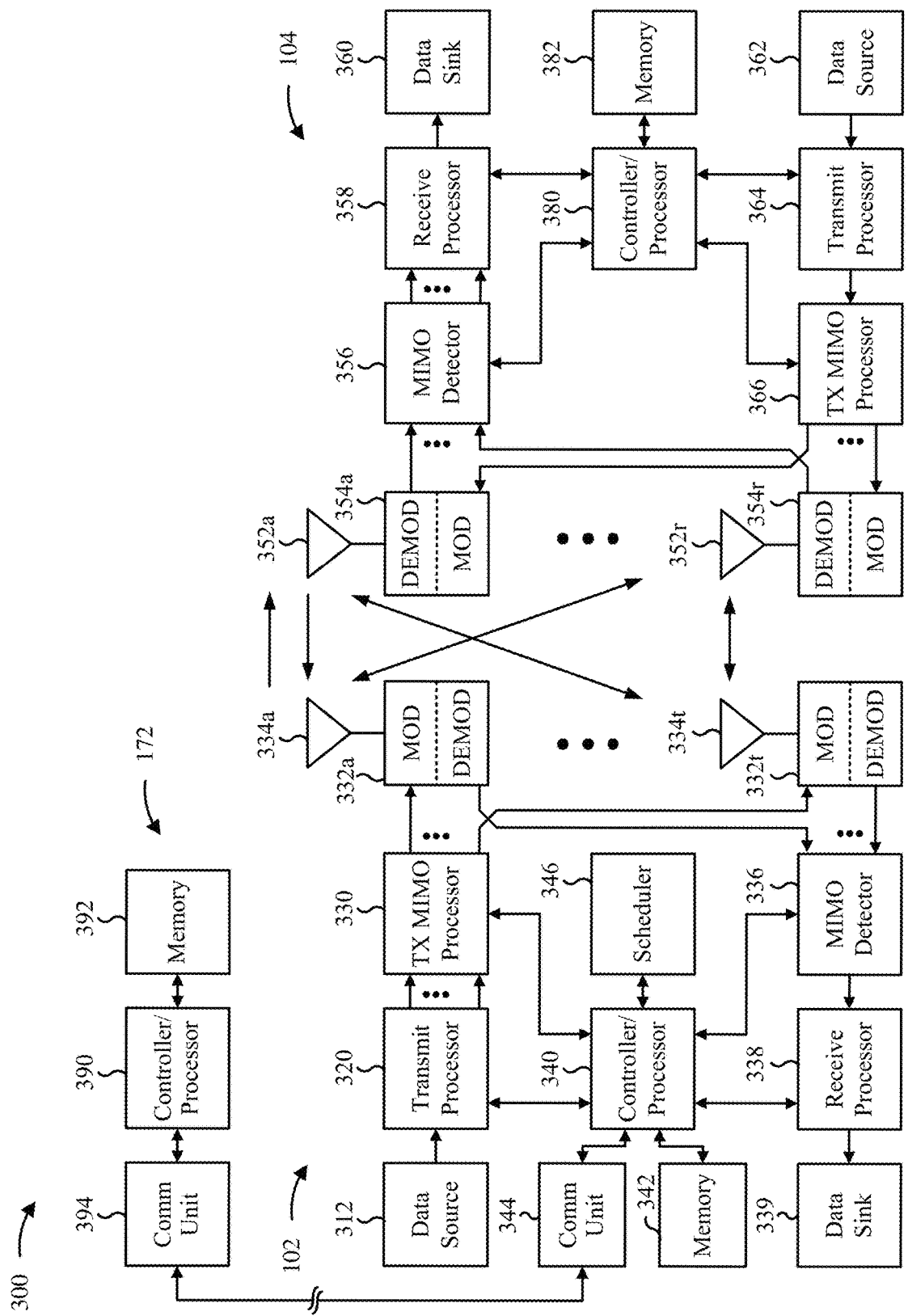
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T>1 and R>1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to a network controller, such as location server 172 via communication unit 344, which may include one or more intervening elements. Location server 172 may include communication unit 394, controller/processor 390, and memory 392.

Controller/processor 340 of base station 102, controller/processor 380 of UE 104, controller 390 of location server 172, which may be location server 172, and/or any other component(s) of FIG. 3 may perform one or more techniques as described in more detail elsewhere herein. For example, controller/processor 380 of UE 104, controller 390 of location server 172, controller/processor 340 of base station 102, and/or any other component(s) of FIG. 3 may perform or direct operations of, for example, processes 900 and 1600 of FIGS. 9 and 16, and/or other processes as described herein. Memories 342, 382, and 392 may store data and program codes for base station 102, UE 104, and location server 172, respectively. In some aspects, memory 342 and/or memory 382 and/or memory 392 may comprise a non-transitory computer-readable medium storing one or more instructions for wireless communication. For example, the one or more instructions, when executed by one or more processors of the UE 104, location server 172, and/or base station 102, may perform or direct operations of, for example, processes 900 and 1600 of FIGS. 9 and 16 and/or other processes as described herein. A scheduler 346 may schedule UEs for data transmission on the downlink and/or uplink.

As indicated above, FIG. 3 is provided as an example. Other examples may differ from what is described with regard to FIG. 3.

In particular implementations, the UE 104 may have circuitry and processing resources capable of obtaining location related measurements (also referred to as location measurements), such as measurements for signals received from GPS or other Satellite Positioning Systems (SPS's), measurements for cellular transceivers such as base stations 102, and/or measurements for local transceivers. UE 104 may further have circuitry and processing resources capable of computing a position fix or estimated location of UE 104 based on these location related measurements. In some implementations, location related measurements obtained by UE 104 may be transferred to a location server, such as the location server 172, location servers 230a, 230b, or LMF 270, after which the location server may estimate or determine a location for UE 104 based on the measurements.

Location related measurements obtained by UE 104 may include measurements of signals received from satellite vehicles (SVs) that are part of an SPS or Global Navigation Satellite System (GNSS) such as GPS, GLONASS, Galileo or Beidou and/or may include measurements of signals received from terrestrial transmitters fixed at known locations (e.g., such as base station 102 or other local transceivers). UE 104 or a separate location server (e.g. location server 172) may then obtain a location estimate for the UE 104 based on these location related measurements using any one of several position methods such as, for example, GNSS, Assisted GNSS (A-GNSS), Advanced Forward Link Trilateration (AFLT), Time Difference Of Arrival (TDOA), Enhanced Cell ID (ECID), TDOA, AoA, AoD, multi-RTT, or combinations thereof. In some of these techniques (e.g. A-GNSS, AFLT and TDOA), pseudoranges or timing differences may be measured by UE 104 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 104. Here, location servers, such as location server 172, location servers 230a, 230b, or LMF 270 may be capable of providing positioning assistance data to UE 104 including, for example, information regarding signals to be measured by UE 104 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, TDOA, AoA, AoD, multi-RTT, and ECID. The facilitation may include improving signal acquisition and measurement accuracy by UE 104 and/or, in some cases, enabling UE 104 to compute its estimated location based on the location measurements. For example, a location server may comprise an almanac (e.g., a Base Station Almanac (BSA)) which indicates the locations and identities of cellular transceivers and transmitters (e.g. base stations 102) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 104 may obtain measurements of signal strength (e.g. received signal strength indication (RSSI) or reference signal received power (RSRP)) for signals received from cellular transceivers (e.g., base stations 102) and/or local transceivers and/or may obtain a signal to noise ratio (S/N), a reference signal received quality (RSRQ), or a round trip signal propagation time (RTT) between UE 104 and a cellular transceiver (e.g., base stations 102) or a local transceiver. A UE 104 may transfer these measurements to a location server, to determine a location for UE 104, or in some implementations, UE 104 may use these measurements together with positioning assistance data (e.g. terrestrial almanac data or GNSS SV data such as GNSS Almanac and/or GNSS Ephemeris information) received from the location server to determine a location for UE 104.

An estimate of a location of a UE 104 may be referred to as a location, location estimate, location fix, fix, position, position estimate or position fix, and may be geodetic, thereby providing location coordinates for the UE 104 (e.g., latitude and longitude) which may or may not include an altitude component (e.g., height above sea level, height above or depth below ground level, floor level or basement level). Alternatively, a location of the UE 104 may be expressed as a civic location (e.g., as a postal address or the designation of some point or small area in a building such as a particular room or floor). A location of a UE 104 may also include an uncertainty and may then be expressed as an area or volume (defined either geodetically or in civic form) within which the UE 104 is expected to be located with some given or default probability or confidence level (e.g., 67% or 95%). A location of a UE 104 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 104 or by another entity such as base station 102) that are used to determine (e.g. calculate) a location estimate for UE 104 may be referred to as measurements, location measurements, location related measurements, positioning measurements or position measurements and the act of determining a location for the UE 104 may be referred to as positioning of the UE 104 or locating the UE 104.

Figure 4:
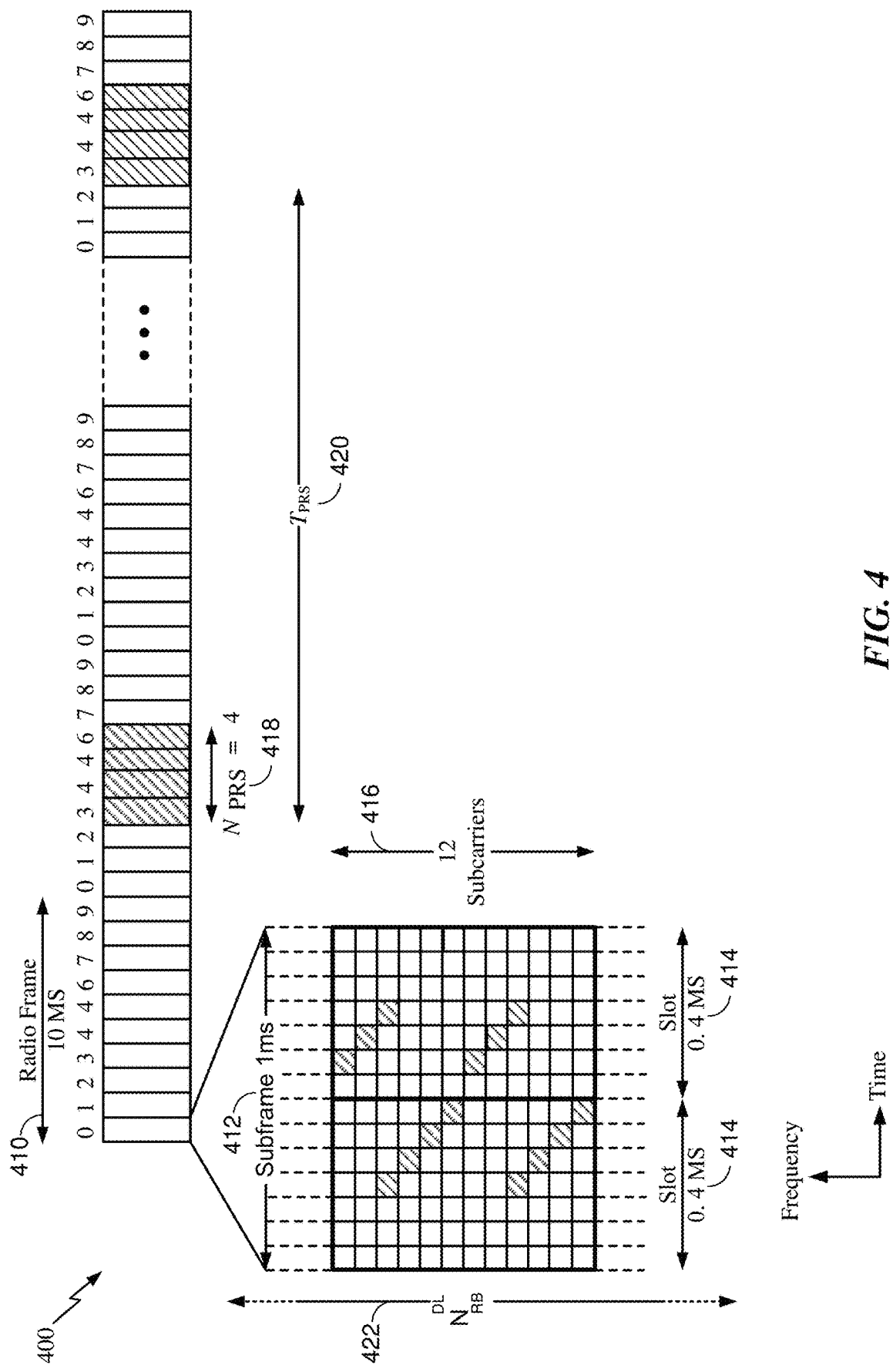
FIG. 4 shows a structure of an exemplary subframe sequence for a positioning reference signal (PRS).

FIG. 4 shows a structure of an exemplary subframe sequence 400 with positioning reference signal (PRS) positioning occasions. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G NR. For example, with 5G NR, the resource grid is nearly identical to that used with LTE, but the physical dimensions, e.g., subcarrier spacing, number of OFDM symbols within a radio frame) varies in NR depending on the numerology.

In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Figure 5:
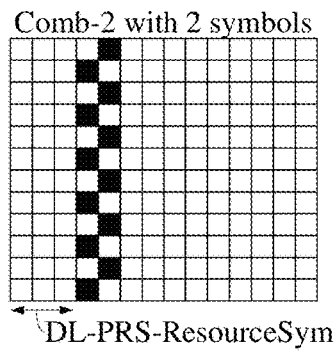
FIG. 5 illustrates a nine different positioning reference signal (PRS) frame structures with varying symbol and comb values.
Figure 5:
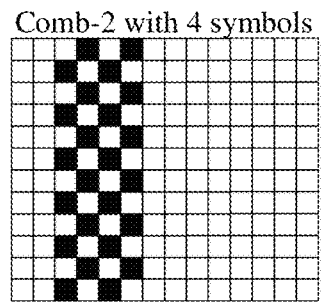
Figure 5:
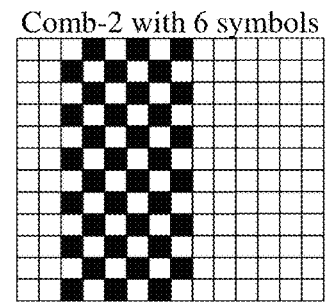
Figure 5:
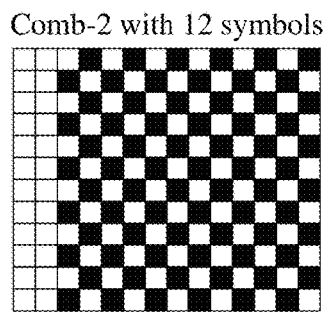
Figure 5:
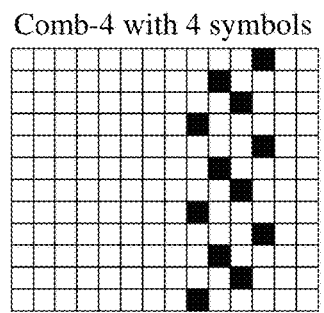
Figure 5:
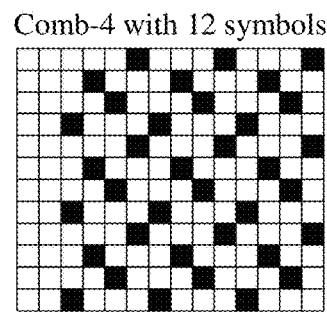
Figure 5:
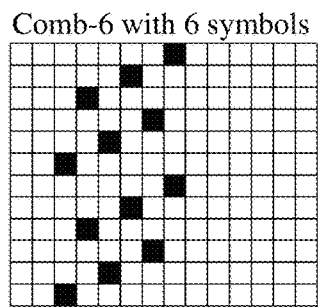
Figure 5:
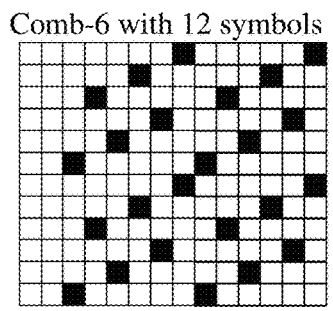
Figure 5:
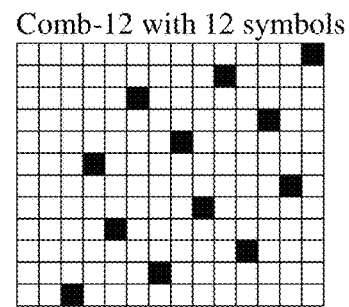

FIG. 5 illustrates nine different DL positioning reference signal (PRS) frame structure options available in 5G NR, where each PRS frame structure in FIG. 5 illustrates the transmission of a DL PRS with a shaded square. A DL PRS resource may span within a slot 2, 4, 6, 12 consecutive symbols with a staggered pattern of 2, 4, 6, or 12 in the frequency-domain. The PRS frame structures are identified with the number of symbols of the subframe in each sub-carrier, during which PRS are transmitted. The term "symbol" is well defined in LTE and NR as a collection of sub-carriers transmitted over some common and fixed time duration. The PRS frame structures are further identified with the staggering of the frequency of transmission in each symbol, referred to as Comb. For example, the top left PRS frame structure uses 2 symbols (with a DL-PRS-Resource-SymbolOffset of 3), where only every other sub-carrier is utilized within each symbol, i.e., Comb-2. The bottom left PRS frame structure uses 6 symbols (DL-PRS-ResourceSymbolOffset of 2), and only every sixth sub-carrier is utilized within each symbol, i.e., Comb-6. Thus, the top row of FIG. 5 illustrate three PRS frame structures with 2, 4, and 6 symbols, all of which have a Comb 2 structure, the middle row illustrates three PRS frame structures having 12, 4, and 12 symbols and having Comb-2, Comb-4 and Comb-4 structures, respectively, and the bottom row illustrates three PRS frame structures with 6, 12, and 12 symbols having Comb-6, Comb-6, and Comb-12 structures, respectively.

Thus, for each transmitted PRS, the PRS is repeated over a number of subframes in each positioning occasion. Additionally, the PRS is transmitted with a bandwidth that is the full frequency spectrum, e.g., all subcarrier frequencies. During reception of the PRS, the UE 104 tunes the radio signal receiver to the bandwidth of the PRS and receives, processes, and integrates over all repetitions of the PRS to produce the PRS measurement for the sub-frame or frame.

Figure 6:
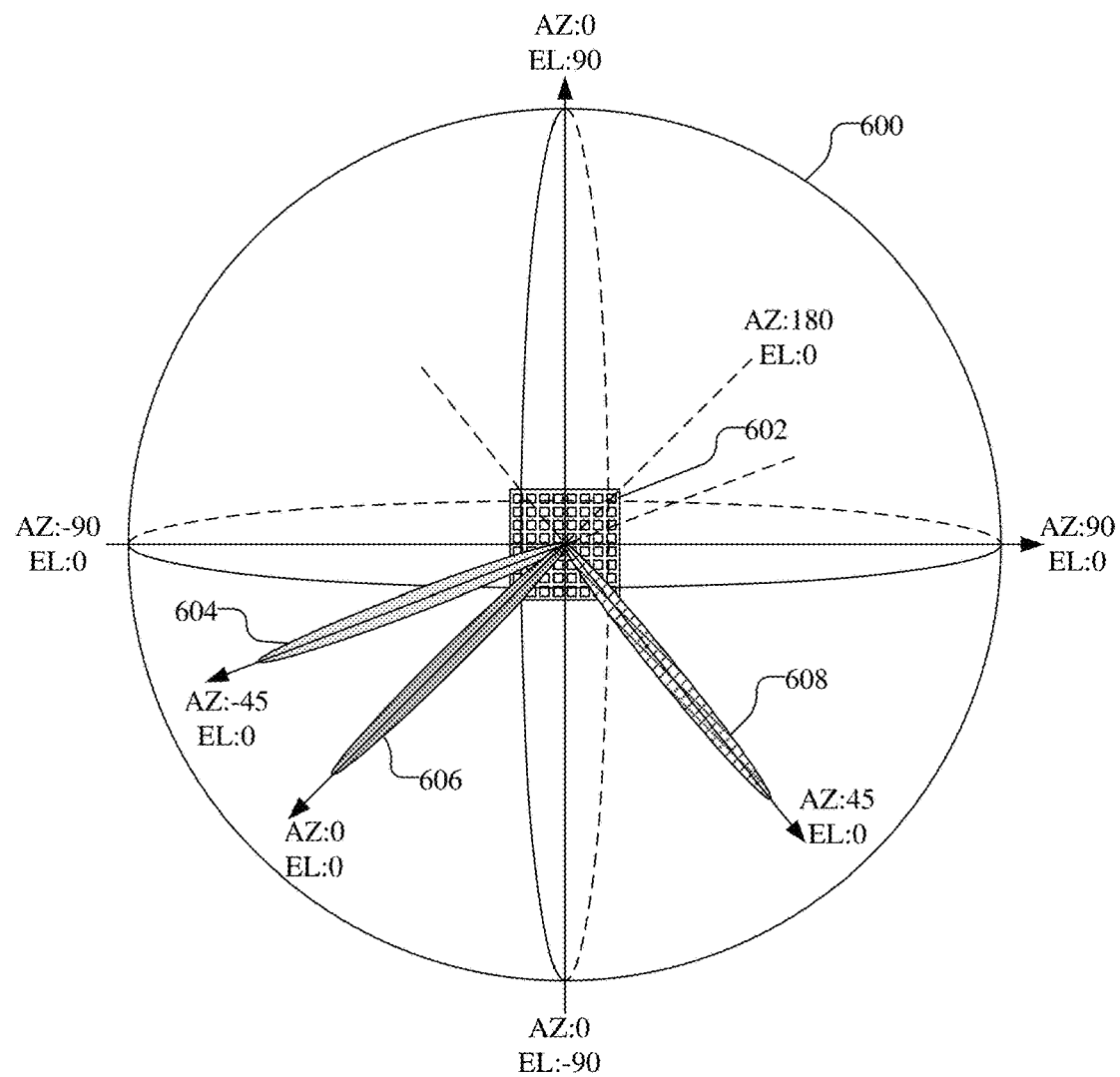
FIG. 6 illustrates an example of narrow beams that may be produced by an antenna panel for a base station.

FIG. 6 illustrates an example of narrow beams that may be produced by an antenna panel 602 for a base station 102.

The antenna panel 602 includes a number of separate antennas which are provided RF current from the transmitter with the correct phase relationship so that the radio waves from the separate antennas add together to increase the radiation in a desired direction, while cancelling to suppress radiation in undesired directions, to produce a beam. The beam can be steered to point in different directions, e.g., changing the azimuth angle and elevation angle, without moving the antenna panel 602. FIG. 6, for example, illustrates the antenna panel 602 in the center of a sphere 600 showing azimuth angles from 0°, ±90°, to 180°, and elevation angles from 0°, ±90°, to 180°. The antenna panel 602 may be controlled to produce beams at various angles, illustrated as beams 604, 606, and 608. In general, the antenna panel 602 may produce an azimuth span of 120° and an elevation span of 60°. By increasing the number of individual antennas present in the antenna panel 602, the width of the beams produced may be reduced. Initial link acquisition at base stations may be performed over beam-formed transmissions in Secondary Synchronization Blocks (SSBs). Beam refinement beyond the SSB stage is either performed over channel state information reference signals (CSI-RSs) or sounding reference signals (SRSs). These stages lead to refined beams at both the base station and user ends. Each beam transmitted by a base station may include PRS.

Figure 7:
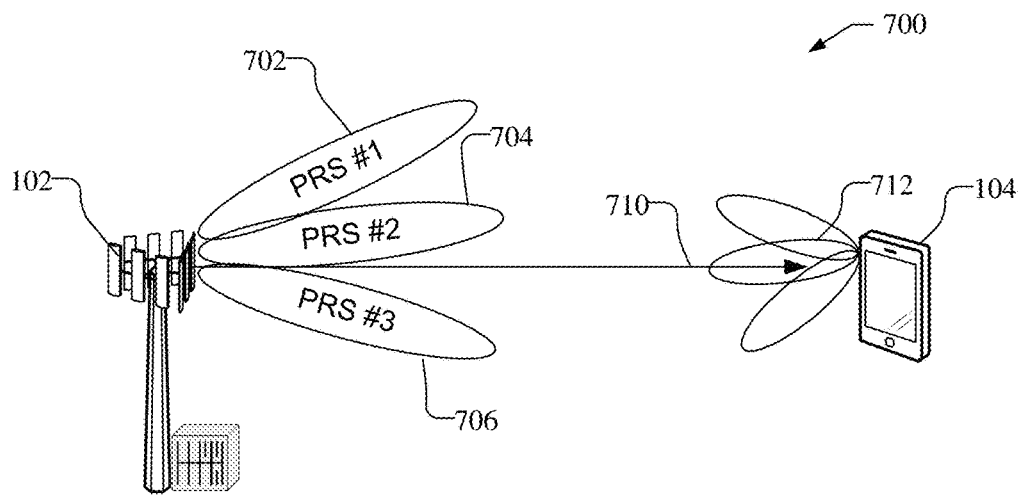
FIG. 7 illustrates a positioning procedure performed by a UE and a base station using PRS in transmit beams.

FIG. 7, by way of example, illustrates a positioning procedure 700 performed by a UE 104 and a base station 102 using PRS in transmit beams. The base station 102, which may be a gNB, transmits PRS resources in a beam-sweeping manner, illustrated as beams 702, 704, and 706, labeled as PRS #1, PRS #2, and PRS #3, respectively. The UE 104 may receive one or more PRS resource in beams 702, 704, and 706, using a beamformed receive beam 712. For example, in time based positioning procedures, such as TDOA, RTT, etc., the UE 104 may use PRS received in a plurality of beams, while angle based measurements, such as AoD, the PRS 706 most closely aligned with the line of sight (LOS) 710 between the base station 102 and the UE 104 may be used. During positioning measurements, PRS received from more than one base station may be used.

In UE-assisted mode, the UE 104 may report the positioning measurement for one or more received PRS through LPP protocol to the location server, e.g., location server 172, which may calculate an estimated position of the UE 104. In UE-based mode, the UE 104 may use assistance data provided by the location server 172, which may include positioning information such as the positions of base stations, along with the positioning measurements, to calculate an estimated position of the UE 104.

Relative to LTE PRS implementations, the flexibility in PRS signaling provided in 5G NR, including multiple symbol and Comb options per subframe, repetitions of the PRS transmission in multiple subframes, and on multiple beams, significantly increases the processing, e.g., million instructions per second (MIPS), memory, and power requirements. For example, Table 1 below illustrates the processing requirements for once cell for different technologies that use different configurations, e.g., illustrated as resource blocks (RBs), Inverse Fourier Fast Transform (IFFT) operations, and number of beams.

TABLE 1

| Technology | Multiplier - Accumulator (MAC) operations | Normalized | Configuration |
| --- | --- | --- | --- |
| LTE | 20360 | 1 | 100 RB, IFFT = 2048 |
| 5G - FR1 | 630272 | 30.9 | 272 RB, IFFT = 8192, beam = 8 |
| 5G - FR2 | 4954112 | 243.3 | 264 RB, IFFT = 8192, beam = 64 |

As can be seen in Table 1, the requirements for processing PRS, and thus, the required power, for 5G FR1 or 5G FR2 is significantly greater than processing PRS with LTE.

Figure 8:
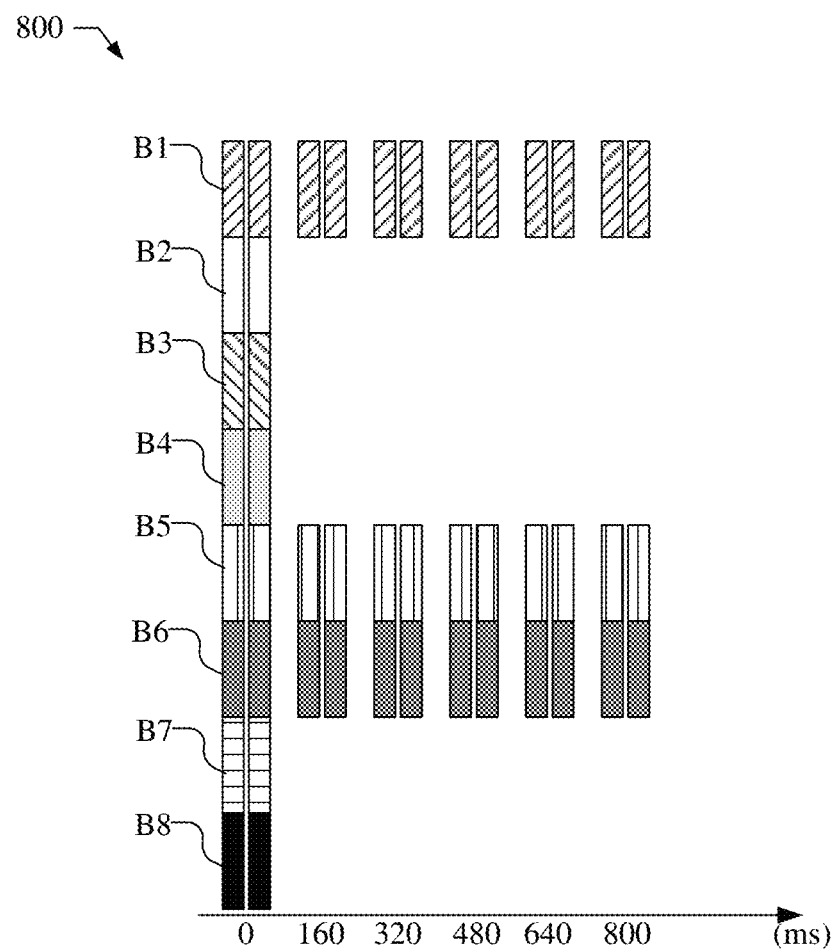
FIG. 8 is a graph illustrating multiple transmission beams and a positioning process using PRS in the beams.

FIG. 8, by way of example, is a graph 800 illustrating 8 transmission beams B1, B2, B3, B4, B5, B6, B7, and B8 produced by a base station in FR1. Each beam includes PRS provided over multiple positioning occasions, e.g., at 0, 160, 320, 480, 640, and 800 ms. Each PRS occasion includes 1 subframe ($N_{PRS}=1$) of PRS and two repetitions, i.e., the number of times the PRS resource (subframe) is transmitted (which may be between, e.g., 1 and 32), illustrated as two bars in each positioning occasion. By way of example, the PRS may use the two symbols with Comb-2 option and may have 272 resource blocks (RBs), and require 4k, 8k, or 16k operations, depending on the performance requirements. With this configuration, for a single cell, the UE needs to decode 2 symbol*8 beam*beam repetitions*$N_{PRS}$, over the full bandwidth of the PRS, which is a large processing requirement, particularly if the PRS BW is high.

As illustrated in FIG. 8 in the first positioning occasion, the UE 104 may process all 8 beams over the full set of resources used by the PRS on each beam, including the full bandwidth and the full number of repetitions. The UE 104 may select the best beams amongst the 8 beams and in future positioning occasions may process only the selected beams, e.g., beams B1, B5, and B6, for the remaining positioning occasions, e.g., at 160, 320, 480, 640, and 800 ms. Even though a reduced number of beams are processed in subsequent positioning occasions, the processor and power requirements for processing the PRS over the full set of resources available for the PRS on each beam may be exceedingly large and it is desirable to reduce the processing requirements.

Accordingly, in one implementation, the UE 104 may divide the PRS processing into two separate modes, e.g., an acquisition mode and a tracking mode. During the acquisition mode, the UE 104 performs a fast scan of all of the beams from a base station 102 transmitting PRS using less than the full set of resources for the PRS, while in the tracking mode the UE 104 processes the full set of resources for the PRS, but for a reduced number of beams.

Figure 9:
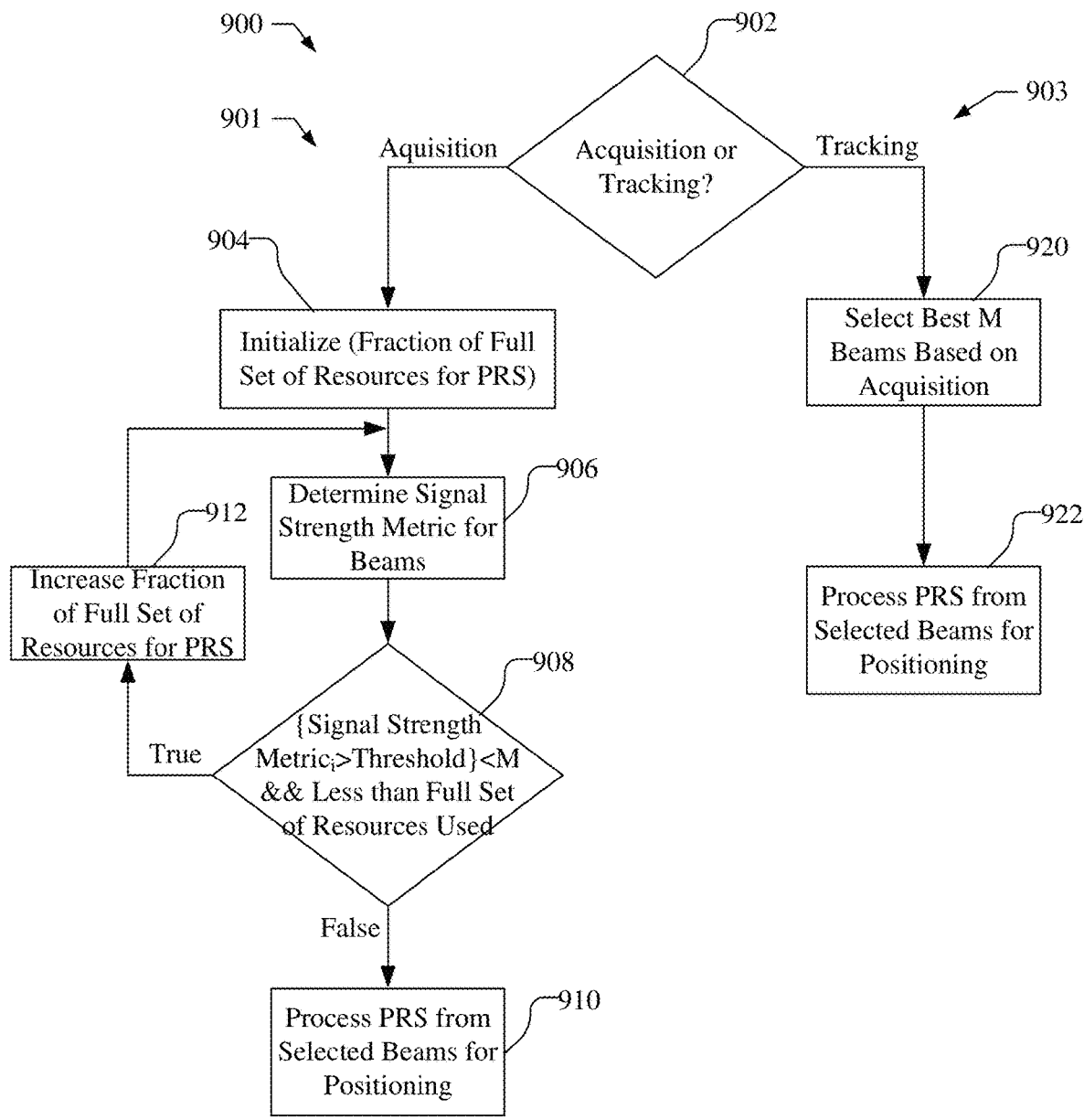
FIG. 9 is a flow chart illustrating a positioning process in which the PRS processing is divided into two separate modes, an acquisition mode and a tracking mode.

FIG. 9 is a flow chart illustrating a positioning process 900 that may be employed by the UE 104 in which the PRS processing is divided into two separate modes, e.g., an acquisition mode and a tracking mode.

As illustrated at block 902, a determination is made whether the UE 104 is in acquisition mode or tracking mode. Acquisition mode 901, for example, is performed during an initial positioning occasion or after being in tracking mode for a predetermined number of occasions or there is an indication that the selection of beams from the initial acquisition may no longer be valid, e.g., if there is an indication that the UE 104 may have moved or conditions have changed.

At block 904, the UE 104 initializes the set of resources that will be used for processing the PRS for each beam in the acquisition mode 901. The set of resources used in acquisition mode 901 is less than the full set of resources for the PRS produced by each beam. The UE 104, for example, may be aware of the full set of resources for the PRS for each beam, including the full bandwidth and full number of repetitions, through assistance data received from the location server 172. The UE 104 may initialize the set of resources by selecting a fraction of the full bandwidth, a fraction of the full number of repetitions, or a combination thereof, to be used for receiving and processing the PRS. By way of example, the UE 104 may select to use ½, ¼, ⅛, 1/16, etc., of the full bandwidth. The receiver, for example may be tuned to receive a fraction of the full bandwidth of the PRS while in acquisition mode. Similarly, the UE 104 may additionally or alternatively select to use a fraction or some portion of the full number of repetitions, e.g., ½, ⅓, ⅔, ¼, ¾ etc., as long as at least one repetition (e.g., one PRS resource) is transmitted. For example, where there are 2 repetitions, i.e., the PRS resource is transmitted two times, the UE 104 may select to use 1 repetition (only the initial PRS resource is transmitted) or 2 repetitions, while if there are 4 repetitions, the UE 104 may select to use 1, 2, 3, or 4 repetitions, where the resulting number of transmitted PRS resources is a whole number, i.e., in the time domain, at least one complete PRS resource (subframe) is transmitted. The processors in the UE 104, thus, may be configured to receive and integrate over less than the full number of repetitions of the PRS while in acquisition mode.

At block 906, the UE 104 receives and processes the PRS signals according to the initialized set of resources and determines a signal strength metric for each beam in the plurality of beams. For example, the UE 104 may receive the PRS by tuning the radio signal receiver to the initialized fraction of the full bandwidth for the PRS on each beam, e.g., ¼ of the full bandwidth of the PRS. The UE 104 may additionally or alternatively receive and integrate over the fraction of the full number of repetitions for the PRS on each beam, e.g., 1, ½, ⅓, or ¼ of the full number of repetitions in the PRS. The UE 104 may measure one or more signal strength metrics, such as SNR, RSRP, or RSRQ for the received PRS for each beam. For example, in one implementation, the channel energy response may be calculated and used to determine the peak SNR.

Figure 10:
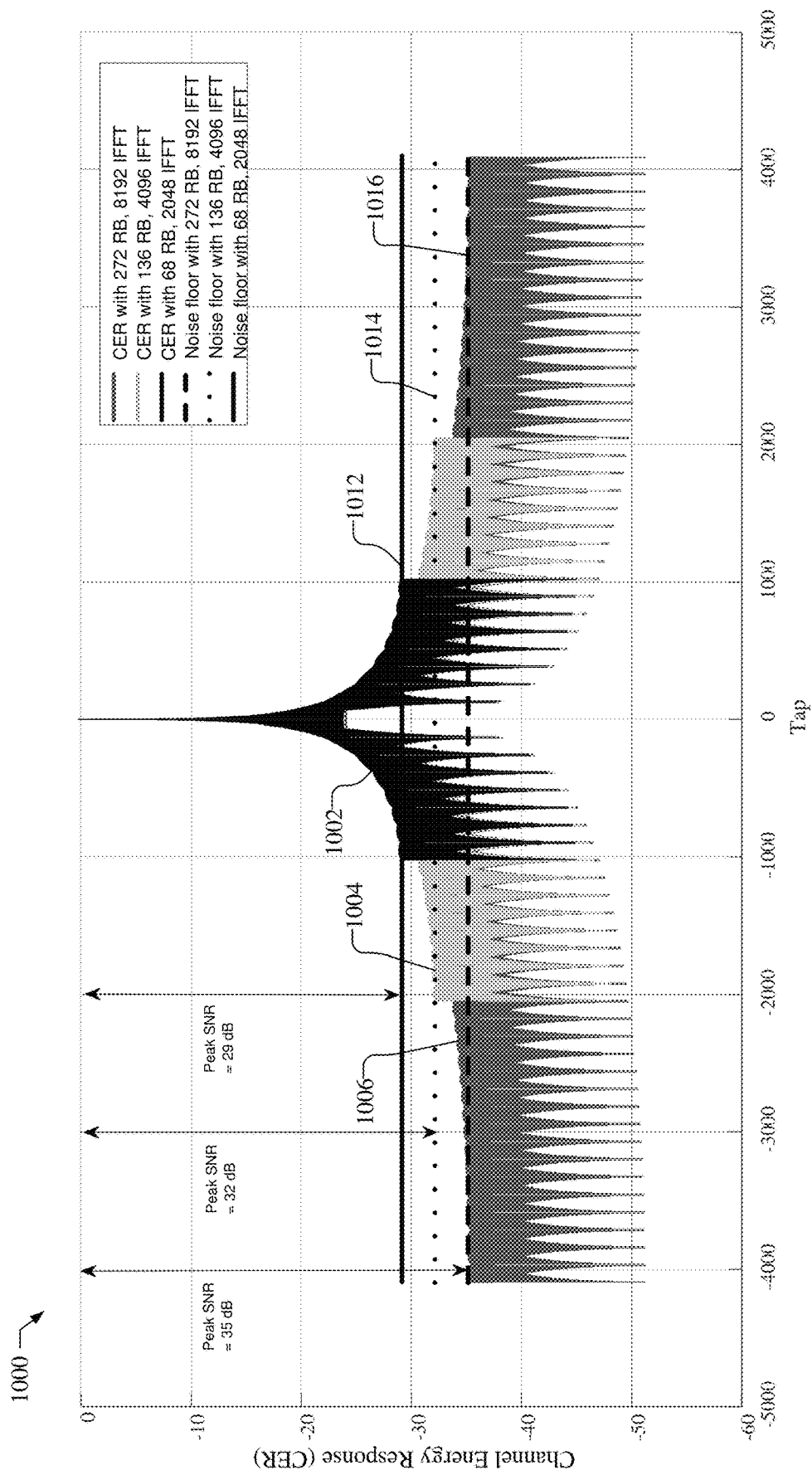
FIG. 10 illustrates a graph of a simulated channel energy response (CER) for PRS that is processed using different fractions of the full set of resources.

FIG. 10, by way of example, illustrates a graph 1000 of a simulated channel energy response (CER) for PRS that is processed using different fractions of the full set of resources (different fractions of the full bandwidth). For example, graph 1000 illustrates the CER 1002 for a PRS with 68 RBs and 2048 IFFT (corresponding to a ¼ of the bandwidth), a CER 1004 for a PRS with 138 RB and 4096 IFFT (corresponding to a ½ of the bandwidth), and a CER 1006 for a PRS with 272 RB and 8192 IFFT (corresponding to the full bandwidth). The noise floors 1012, 1014 and 1016 associated with each of the CERs 1002, 1004, and 1006, respectively is also illustrated. The peak SNR is determined based on the difference between the CER value at tap 0 and the noise floor. For example, CER 1002 has a peak SNR of 29 dB, CER 1004 has a peak SNR of 32 dB, and CER 1006 has a peak SNR of 35 dB. Thus, as can be seen, by reducing the set of resources used to process the PRS, there is a measurable performance loss in the peak SNR. For example, there is an approximate 3 dB loss for every half bandwidth reduction. Similarly, reducing the set of resources used to process the PRS results in a measurable performance loss in other signal strength metrics, such as RSRP, or RSRQ.

Referring back to FIG. 9, at block 908, the one or more signal strength metrics for each beam (i) may be compared to predetermined thresholds corresponding to the one or more signal strength metrics to determine if a predetermined number M of beams have signal strength metrics that exceed the predetermined thresholds and whether less than the full set of resources were used to process the PRS. The predetermined threshold used for the comparison to the signal strength metrics may be empirically selected based on the sensitivity of the radio signal receiver. For example, referring to FIG. 10, in some implementations, an SNR threshold of 25 dB may be used with some devices, but other thresholds may be used, e.g., in a range of 15 to 25. The beams having signal strength metrics that exceed the predetermined thresholds are considered the best beams and are selected to be used for positioning and to be used during the tracking mode. The number M of beams selected may be based on the type of positioning measurement being performed. For example, a timing based measurement may use multiple beams, e.g., 3 beams, while an angle based measurement may use a single beam, e.g., the beam presumably closest so the line of sight.

If in block 908, it is determined that the predetermined number M of beams have signal strength metrics that meet the requisite threshold(s), then the process flows to block 910 and the PRS from the selected beams are processed for positioning, before returning to block 902.

In block 908, however, it may be determined that fewer than (or more than) the predetermined number M of beams have signal strength metrics that meet the requisite threshold(s), and the fraction of the full set of resources used in the acquisition mode to process the PRS may be increased (or decreased) accordingly. For example, if in block 908 it is determined that less than the predetermined number M of beams may be selected, e.g., fewer than the predetermined number of beams have signal strength metrics that exceed the predetermined threshold(s), the process flows to block 912 and the fraction of the full set of resources for the PRS is increased, e.g., doubled or otherwise increased, and the acquisition mode is repeated. For example, in the next positioning occasion the increased set of resources is used to process the PRS from each beam and one or more signal strength metrics are determined (906) and compared to corresponding thresholds. The process is repeated until the predetermined number M of beams have signal strength metrics that meet the requisite threshold(s) or the full set of resources were used, and thus, a further increase in resources used to process the PRS is not possible.

Alternatively, if in block 908 it is determined that more than the predetermined number of beams have signal strength metrics that meet the requisite threshold(s), then only the predetermined number M of beams are selected (e.g., the first M beams having signal strength metrics that meet the requisite threshold(s)) and the process flows to block 910. The next time the UE 104 is in acquisition mode 901, which may be after a predetermined number of positioning occasions or an indication that the initial selection of beams is no longer valid, or in some implementations, in the next positioning occasion, the fraction of the full set of resources for the PRS may be decreased (e.g., halved) and the acquisition mode 901 repeated until only the predetermined number M of beams have signal strength metrics that meet the requisite threshold(s).

Once the predetermined number M of beams have been selected during the acquisition mode, at the next positioning occasion, the process 900 goes into tracking mode 903 via block 902. In tracking mode 903, the UE 104 receives and processes the PRS from the selected beams using the full set of resources for the PRS produced by each selected beam. For example, at block 920 in the tracking mode, the UE 104 selects the best M beams for tracking, as determined in the acquisition mode 901. At block 922, the PRS from the selected beams are received and processed for positioning using the full set of resources for the PRS in each selected beam. Thus, the receiver may be tuned to receive the full bandwidth of the PRS while in tracking mode and the processors may be configured to receive and integrate over the full number of repetitions of the PRS while in tracking mode.

The UE 104 may return to the acquisition mode 901 after a predetermined number of positioning occasions in tracking mode 903. The UE 104 may also or alternatively return to the acquisition mode if a difference in the signal strength metrics for the selected beams over multiple positioning occasions indicates that the selection of beams from the initial acquisition mode 901 is no longer valid, e.g., the UE 104 has significantly moved and/or conditions have changed. For example, at each positioning occasion, one or more signal strength metrics, e.g., SNR, RSRP, RSRQ, etc., for the selected beams may be compared to measured signal strength metrics from one or more preceding positioning occasions, e.g., the measured signal strength metrics from the immediately preceding positioning occasion, the measured signal strength metrics from the first positioning occasion used in tracking mode 903, or an average (or other statistical combination) of the measured signal strength metrics from a plurality of positioning occasions used in tracking mode 903. If the difference between the signal strength metrics exceeds a predetermined threshold, the UE 104 may have moved or conditions may have changed and the initially selected beams may no longer be the best beams. Accordingly, the process 900 may then return to the acquisition mode 901 at block 902.

Figure 11A:
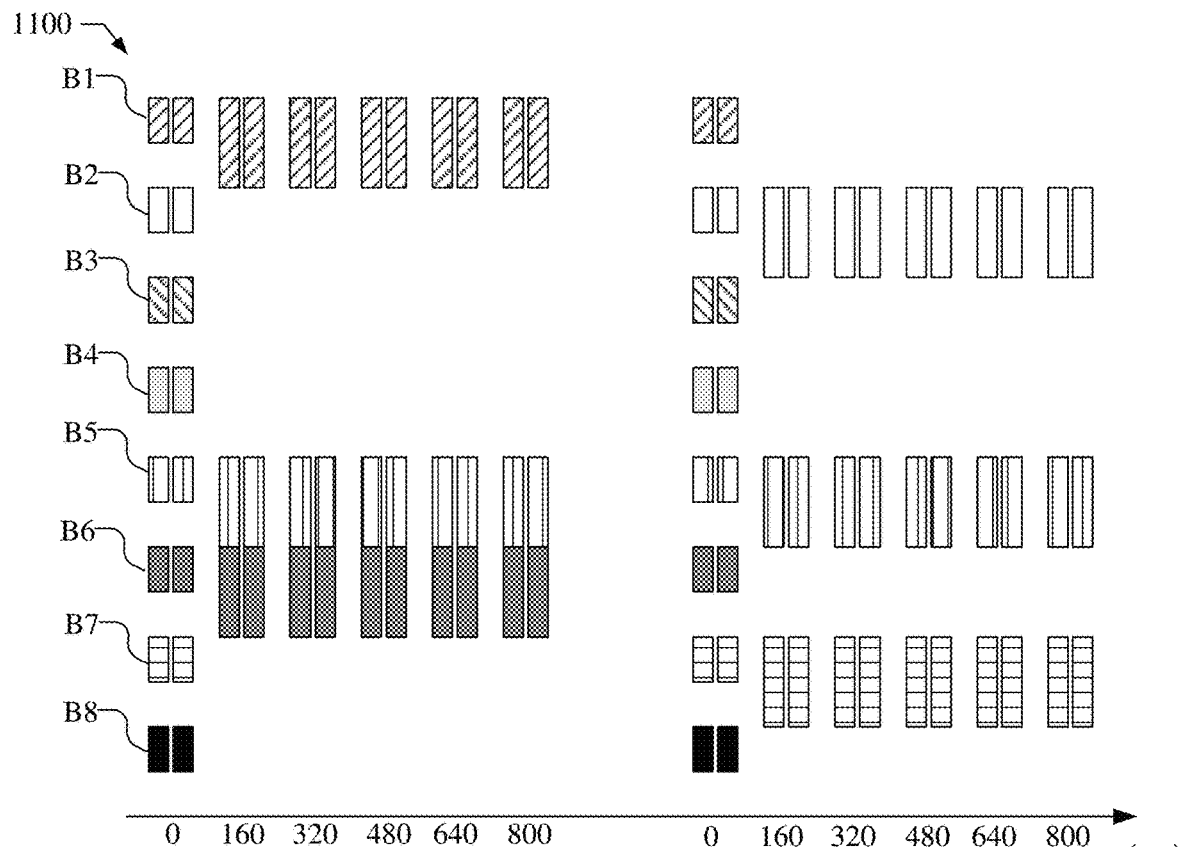
FIGS. 11A and 11B are graphs illustrating multiple transmission beams and a positioning process using an acquisition mode that use less than the full set of resources for the PRS and a tracking mode.
Figure 11B:
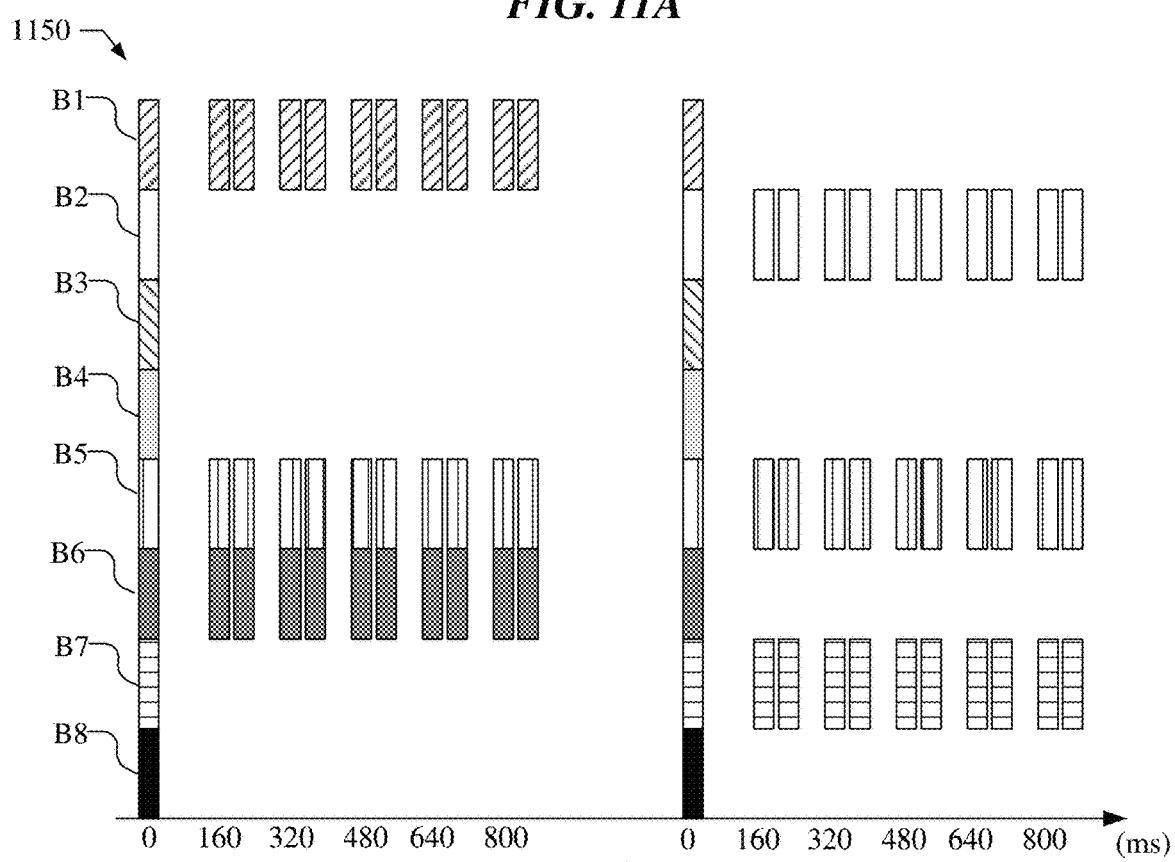

FIGS. 11A and 11B, by way of example, are graphs 1100 and 1150 that illustrate 8 transmission beams B1, B2, B3, B4, B5, B6, B7, and B8 produced by a base station in FR1. Similar to FIG. 8, each beam includes PRS provided over multiple positioning occasions, e.g., at 0, 160, 320, 480, 640, and 800 ms. Each PRS occasion includes 1 subframe ($N_{PRS}$=1) of PRS and two repetitions, illustrated as two bars in each positioning occasion. The PRS may use the two symbols with Comb-2 option and may have 272 resource blocks (RBs), and may require 4k, 8k, or 16k operations, depending on the performance requirements. Unlike FIG. 8, in FIGS. 11A and 11B, the UE 104 operates in an acquisition mode (block 901 of FIG. 9) during the first positioning occasion, e.g., at 0ms, during which the UE 104 receives and processes the PRS for each beam using less than the full set of resources, and operates in a tracking mode (block 903 of FIG. 9) during the remaining positioning occasions, e.g., 160, 320, 480, 640, and 800 ms, during which the UE 104 receives and processes the PRS for each beam using the full set of resources. Two sets of acquisition and tracking are illustrated in FIGS. 11A and 11B.

In FIG. 11A the UE 104 operates in acquisition mode (block 901 of FIG. 9) by receiving and processing the PRS for each beam using half of the full bandwidth of the PRS for each beam, which is illustrated by the relatively shorter bars in the positioning occasion at 0ms. By way of example, beams B1, B5, and B6 may be selected as the best beams for positioning measurements during the acquisition mode in the first positioning occasion, e.g., based on one or more signal strength metrics that meet the requisite threshold(s). In the tracking mode (block 903 of FIG. 9) in subsequent positioning occasions, e.g., at 160, 320, 480, 640, and 800 ms, the PRS from beams B1, B5, and B6 are received and processed using the full set of resources, e.g., the full bandwidth of the PRS for each beam, as illustrated by the relatively longer bars, for the positioning measurements.

FIG. 11B the UE 104 operates in acquisition mode (block 901 of FIG. 9) by receiving and processing the PRS for each beam using 1 repetition of the PRS for each beam at 0ms, which is illustrated by the presence of only 1 bar in the positioning occasion at 0ms. By way of example, beams B1, B5, and B6 may be selected as the best beams for positioning measurements during the acquisition mode during the first positioning occasion, e.g., based on one or more signal strength metrics that meet the requisite threshold(s). In the tracking mode (block 903 of FIG. 9) in subsequent positioning occasions, e.g., at 160, 320, 480, 640, and 800 ms, the PRS from beams B1, B5, and B6 are received and processed using the full set of resources, e.g., the full number of repetitions of the PRS for each beam, as illustrated by the presence of two bars, for the positioning measurements.

FIGS. 11A and 11B illustrate a second set of acquisition and tracking modes, where the first positioning occasion (e.g., 0ms) uses less than the full set of resources during acquisition mode and the remaining positioning occasions use the full set of resources during tracking mode. By way of example, the UE 104 may return to acquisition mode (block 901 of FIG. 9), after a predetermined number of positioning occasions or if the signal strength metrics for one or more of the beams B1, B5, and B6 in the positioning occasion at 800 ms changes by more than a predetermined threshold, e.g., relative to one or more preceding positioning occasions during the tracking mode. After the second acquisition mode, FIGS. 11A and 11B illustrate that beams B2, B5 and B7 are selected for positioning measurements, e.g., based on one or more signal strength metrics that meet the requisite threshold(s).

Figure 12:
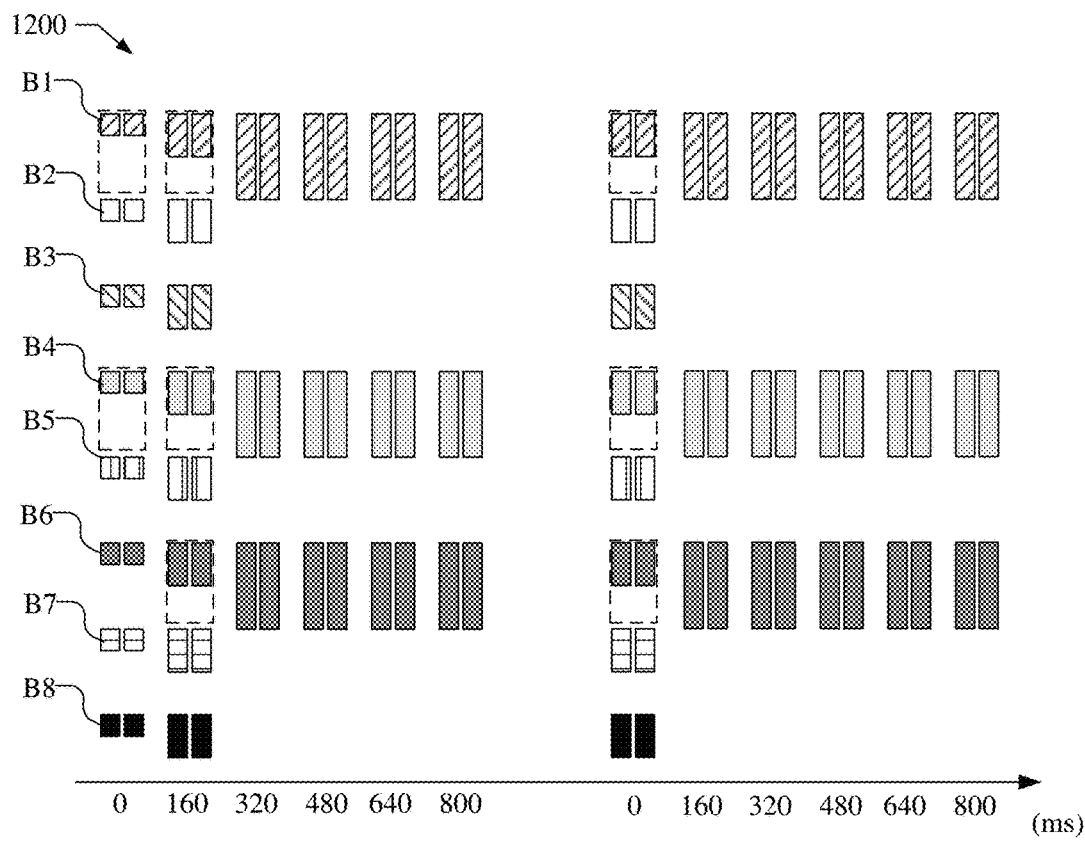
FIG. 12 is a graph illustrating multiple transmission beams and a positioning process using an acquisition mode in which the fraction of resources used for processing the PRS is increased in the acquisition mode.

FIG. 12, by way of example, is a graph 1200 that illustrates 8 transmission beams B1, B2, B3, B4, B5, B6, B7, and B8 produced by a base station in FR1. Similar to FIG. 11A, each beam includes PRS provided over multiple positioning occasions, e.g., at 0, 160, 320, 480, 640, and 800 ms. Each PRS occasion includes 1 subframe ($N_{PRS}$=1) of PRS and two repetitions, illustrated as two bars in each positioning occasion. The PRS may use the two symbols with Comb-2 option and may have 272 resource blocks (RBs), and require 4k, 8k, or 16k operations, depending on the performance requirements. Two sets of acquisition and tracking are illustrated in FIG. 12.

In FIG. 12, the UE 104 operates in acquisition mode (block 901 of FIG. 9) by receiving and processing the PRS for each beam using a quarter of the full bandwidth of the PRS for each beam, which is illustrated by the relatively shorter bars in the positioning occasion at 0ms. In this example, fewer than the predetermined number of beams (3) have signal strength metrics that exceed the predetermined thresholds (block 908 of FIG. 9), illustrated with the dashed boxes around beams B1 and B4. Accordingly, the fraction of the full set of resources for the PRS is increased, e.g., doubled, in the next positioning occasion (block 912 of FIG. 9). In the second positioning occasion at 160 ms, the acquisition mode is repeated using half of the full bandwidth of the PRS for each beam. With half of the full bandwidth of the PRS for each beam used the predetermined number (3) of beams have signal strength metrics that exceed the predetermined thresholds, as illustrated with the dashed boxes for beams B1, B4, and B6 during the second positioning occasion at 160 ms. Accordingly, the UE 104 may select the beams B1, B4, and B6 for the positioning measurements. During the tracking mode (block 903 of FIG. 9) in the subsequent positioning occasions, e.g., at 320, 480, 640, and 800 ms, the PRS from beams B1, B4, and B6 are received and processed using the full set of resources, e.g., the full bandwidth of the PRS for each beam, for the positioning measurements. In an implementation where a reduced number of repetitions is used during acquisition mode (e.g., as illustrated in FIG. 11B), if fewer than the predetermined number of beams (3) have signal strength metrics that exceed the predetermined thresholds the number of repetitions may be increased, e.g., doubled, increased incrementally, or otherwise increased, in the next positioning occasion (block 912 of FIG. 9).

In a subsequent set of acquisition and tracking, e.g., after a predetermined number of positioning occasions during the tracking mode or an indication that the UE 104 has moved or conditions have changed, the UE 104 may use the set of resources that successfully identified the predetermined number (3) beams, i.e., half of the full bandwidth of the PRS for each beam.

Figure 13:
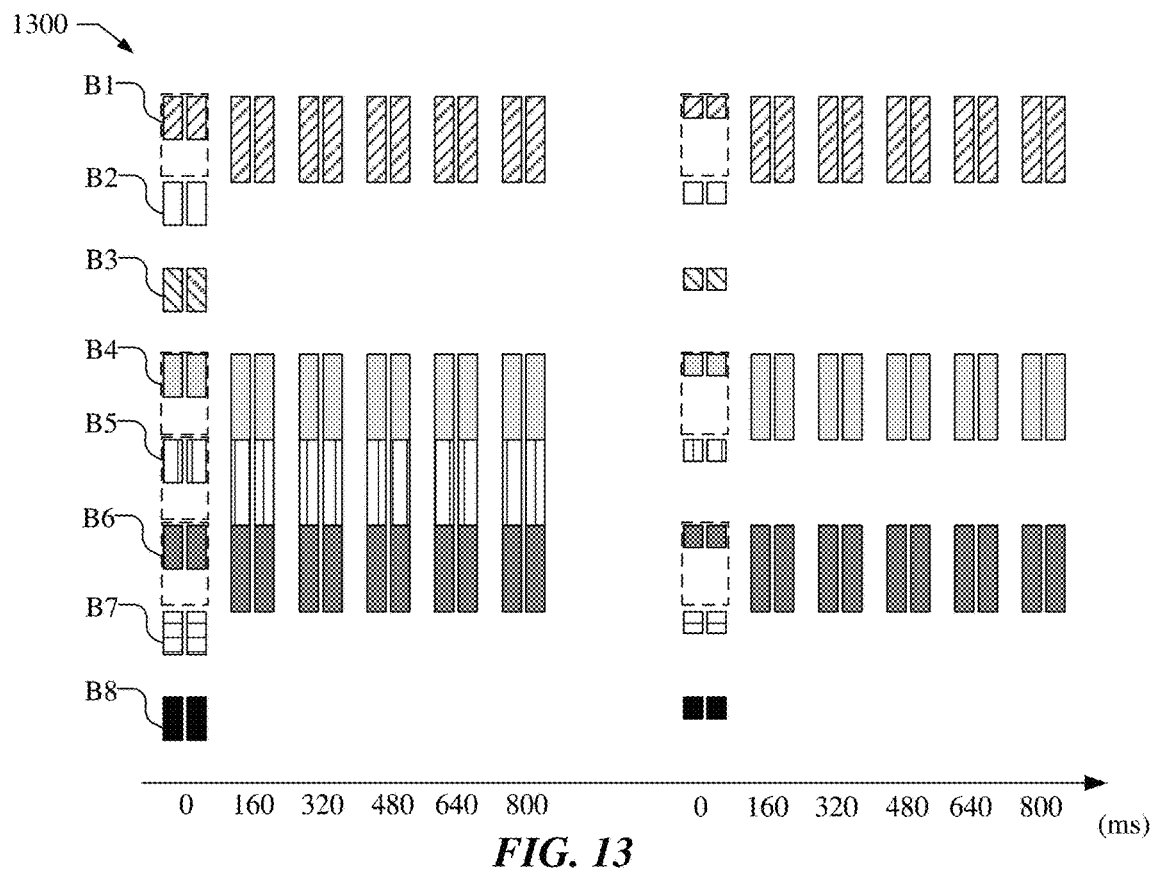
FIG. 13 is a graph illustrating multiple transmission beams and a positioning process using an acquisition mode in which the fraction of resources used for processing the PRS is decreased in the acquisition mode.

FIG. 13, by way of example, is a graph 1300 that illustrates 8 transmission beams B1, B2, B3, B4, B5, B6, B7, and B8 produced by a base station in FR1. Similar to FIG. 11A, each beam includes PRS provided over multiple positioning occasions, e.g., at 0, 160, 320, 480, 640, and 800 ms. Each PRS occasion includes 1 subframe ($N_{PRS}=1$) of PRS and two repetitions, illustrated as two bars in each positioning occasion. The PRS may use the two symbols with Comb-2 option and may have 272 resource blocks (RBs), and require 4k, 8k, or 16k operations, depending on the performance requirements. Two sets of acquisition and tracking are illustrated in FIG. 13.

In FIG. 13, the UE 104 operates in acquisition mode (block 901 of FIG. 9) by receiving and processing the PRS for each beam using half of the full bandwidth of the PRS for each beam. In this example, more than the predetermined number of beams (3) have signal strength metrics that exceed the predetermined thresholds (block 908 of FIG. 9), illustrated with the dashed boxes on beams B1, B4, B5, and B6. Accordingly, a predetermined number of beams (e.g., the first M beams), illustrated as beams B1, B2, and B5, may be selected as the best beams for the positioning measurements and are used in the tracking mode in positioning occasions 160, 320, 480, 640, 800 ms.

In the next acquisition mode, e.g., as illustrated at 0ms in the second set of positioning occasions, the UE 104 decreases the resources used to receive and process the PRS for each beam, e.g., as illustrated as using a quarter of the full bandwidth of the PRS for each beam. In this example, using reduced resources in the second acquisition mode, the predetermined number of beams (3) have signal strength metrics that exceed the predetermined thresholds (block 908 of FIG. 9), illustrated with the dashed boxes on beams B1, B4, and B6. The selected beams may then be used for the positioning measurements and the tracking mode in positioning occasions 160, 320, 480, 640, 800 ms.

Figure 14A:
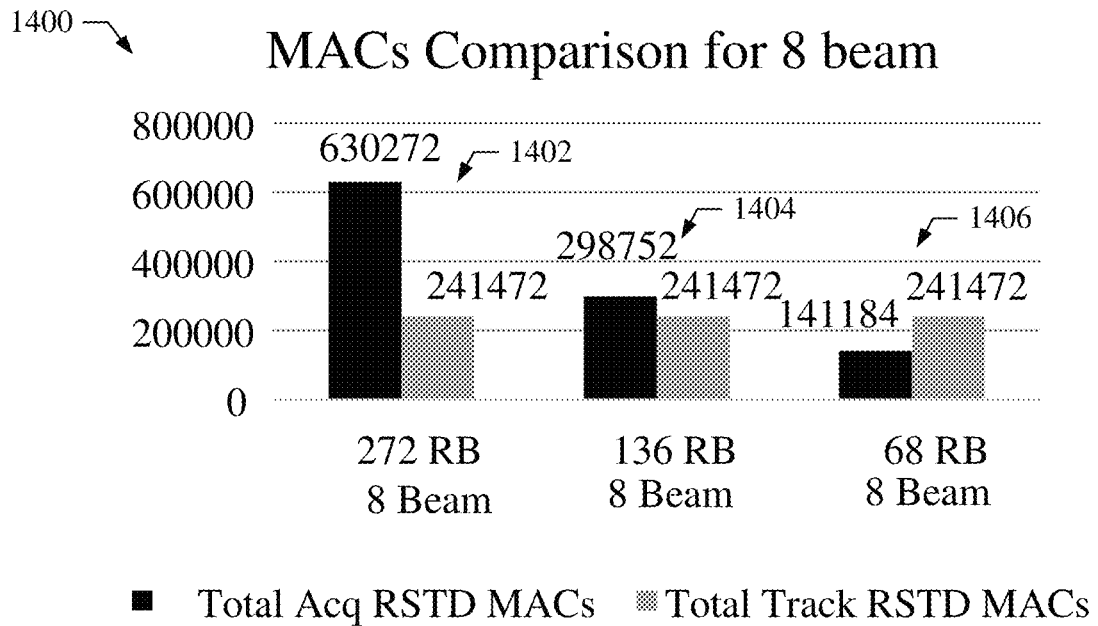
FIGS. 14A and 14B illustrate graphs showing the processing and power savings through use of the acquisition and tracking modes.
Figure 14B:
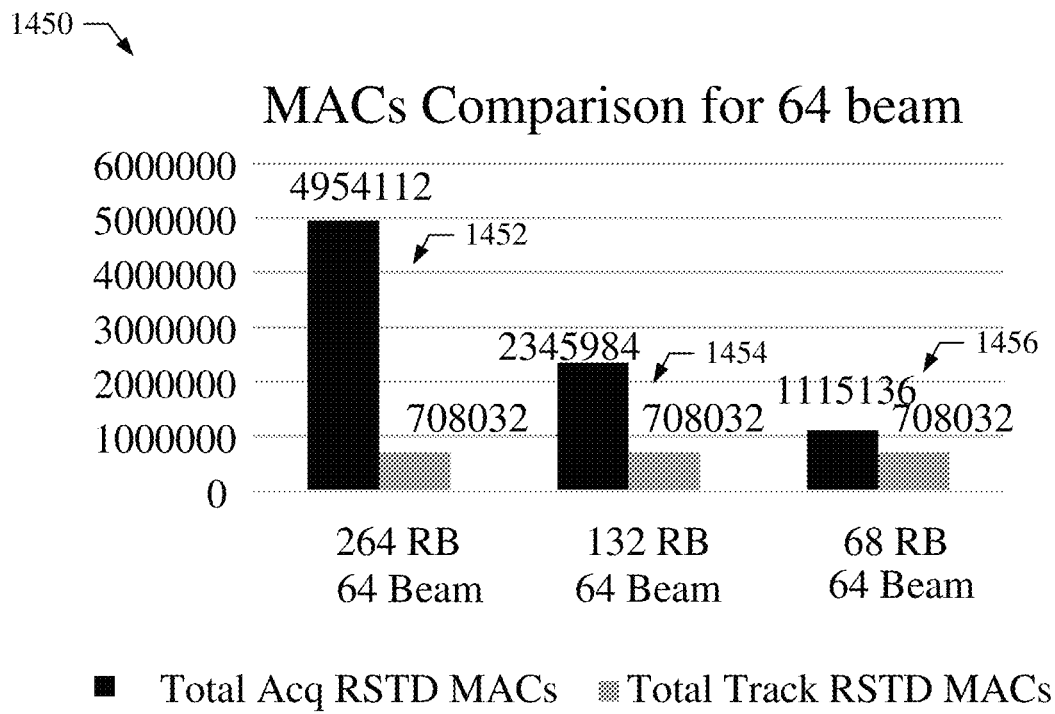

FIGS. 14A and 14B illustrate graphs 1400 and 1450 showing the savings in multiplier-accumulator (MAC) operations for a cell transmitting 8 beams in FR1, and a cell transmitting 64 beams in FR2, respectively. As illustrated in FIG. 14A, as illustrated with bars 1402, the total MACs used to acquire PRS for RSTD over 272 RB (e.g., the full set of resources over all 8 beams) vs MACs used to acquire PRS for RSTD over 272 RB (e.g., the full set of resources over 3 beams) drops from 630,272 to 241,472. As illustrated with bars 1404, the total MACs used to acquire PRS for RSTD over 136 RB (e.g., half of the resources over all 8 beams) vs MACs used to acquire PRS for RSTD over 272 RB (e.g., the full set of resources over 3 beams) drops from 298,752 to 241,472. As illustrated with bars 1406, the total MACs used to acquire PRS for RSTD over 68 RB (e.g., a quarter of the resources over all 8 beams) vs MACs used to acquire PRS for RSTD over 272 RB (e.g., the full set of resources over 3 beams) increases from 141,184 to 241,472. The processing savings (power savings) for the acquisition mode are illustrated in Table 2.

TABLE 2

|  | 272 RB | 136 RB | 68 RB |
| --- | --- | --- | --- |
| MAC Operations | 630,272 | 298,752 | 141,184 |
| Percent Savings | 100% | 47.4% | 22.4% |

As illustrated in FIG. 14A, as illustrated with bars 1452, the total MACs used to acquire PRS for RSTD over 264 RB (e.g., the full set of resources over all 64 beams) vs MACs used to acquire PRS for RSTD over 264 RB (e.g., the full set of resources over 3 beams) drops from 4,954,112 to 708,032. As illustrated with bars 1454, the total MACs used to acquire PRS for RSTD over 132 RB (e.g., half of the resources over all 64 beams) vs MACs used to acquire PRS for RSTD over 264 RB (e.g., the full set of resources over 3 beams) drops from 2,345,984 to 708,032. As illustrated with bars 1456, the total MACs used to acquire PRS for RSTD over 68 RB (e.g., a quarter of the resources over all 64 beams) vs MACs used to acquire PRS for RSTD over 264 RB (e.g., the full set of resources over 3 beams) decreases from 1,115,136 to 708,032. The processing savings (power savings) for the acquisition mode are illustrated in Table 3.

TABLE 3

|  | 264 RB | 132 RB | 68 RB |
| --- | --- | --- | --- |
| MAC Operations | 4,954,112 | 2,345,984 | 1,115,136 |
| Percent Savings | 100% | 47.3% | 22.5% |

Thus, as can be seen in FIGS. 14A and 14B and Tables 2 and 3, the UE 104 may receive a significant processing/power savings in acquisition mode using less than all of the resources for the PRS and the gains are more pronounced using smaller fractions of the full set of resources.

Figure 15:
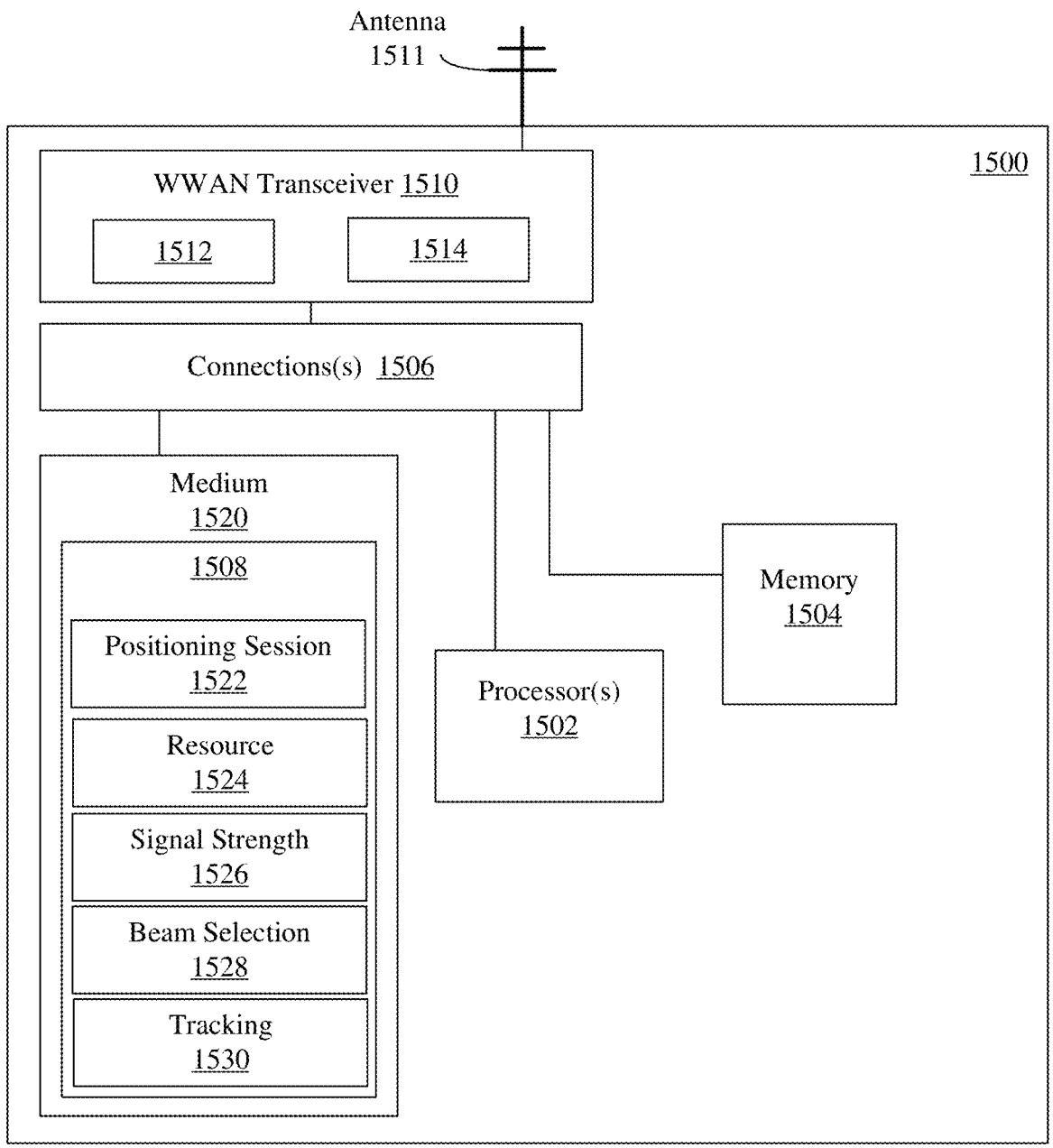
FIG. 15 illustrates a schematic block diagram showing certain exemplary features of a mobile device enabled to support positioning using an acquisition mode and tracking mode.

FIG. 15 shows a schematic block diagram illustrating certain exemplary features of a UE 1500, e.g., which may be UE 104 shown in FIG. 1, enabled to support positioning using an acquisition mode in which less than the full set of resources are used for PRS processing for all beams and a tracking mode in which the full set of resources are used for selected beams, as described herein. The UE 1500 may perform the process flow shown in FIGS. 9 and 16 and algorithms described herein. UE 1500 may, for example, include one or more processors 1502, memory 1504, an external interface such as a transceiver 1510 (e.g., wireless network interface), which may be operatively coupled with one or more connections 1506 (e.g., buses, lines, fibers, links, etc.) to non-transitory computer readable medium 1520 and memory 1504. The UE 1500 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1500 may take the form of a chipset, and/or the like. Transceiver 1510 may, for example, include a transmitter 1512 enabled to transmit one or more signals over one or more types of wireless communication networks and a receiver 1514 to receive one or more signals transmitted over the one or more types of wireless communication networks.

In some embodiments, UE 1500 may include antenna 1511, which may be internal or external. UE antenna 1511 may be used to transmit and/or receive signals processed by transceiver 1510. In some embodiments, UE antenna 1511 may be coupled to transceiver 1510. The antenna 1511 may include more than one antenna element, and may be capable of dual polarization, MIMO-capable, beam forming, beam steering, and beam tracking. In some implementations, the antenna 1511 may include a plurality of panels, and each panel may include a multiple antenna array elements. In some embodiments, measurements of signals received (transmitted) by UE 1500 may be performed at the point of connection of the UE antenna 1511 and transceiver 1510. For example, the measurement point of reference for received (transmitted) RF signal measurements may be an input (output) terminal of the receiver 1514 (transmitter 1512) and an output (input) terminal of the UE antenna 1511. In a UE 1500 with multiple UE antennas 1511 or antenna arrays, the antenna connector may be viewed as a virtual point representing the aggregate output (input) of multiple UE antennas. In some embodiments, UE 1500 may measure received signals including signal strength metrics, e.g., SNR, RSRP, RSRQ, and positioning measurements may be processed by the one or more processors 1502. For example, the UE 104 may measure the signal strength metrics of each transmitted beam to determine the best beam(s) received by the UE 104. For example, transmitted beams with signal strength metrics that are above predetermined thresholds may be treated as the best beam(s). The number of beams selected as the best beams may be based on the type of positioning measurements to be performed, e.g., time based measurements or angle based measurements.

The one or more processors 1502 may be implemented using a combination of hardware, firmware, and software. For example, the one or more processors 1502 may be configured to perform the functions discussed herein by implementing one or more instructions or program code 1508 on a non-transitory computer readable medium, such as medium 1520 and/or memory 1504. In some embodiments, the one or more processors 1502 may represent one or more circuits configurable to perform at least a portion of a data signal computing procedure or process related to the operation of UE 1500.

The medium 1520 and/or memory 1504 may store instructions or program code 1508 that contain executable code or software instructions that when executed by the one or more processors 1502 cause the one or more processors 1502 to operate as a special purpose computer programmed to perform the techniques disclosed herein. As illustrated in UE 1500, the medium 1520 and/or memory 1504 may include one or more components or modules that may be implemented by the one or more processors 1502 to perform the methodologies described herein. While the components or modules are illustrated as software in medium 1520 that is executable by the one or more processors 1502, it should be understood that the components or modules may be stored in memory 1504 or may be dedicated hardware either in the one or more processors 1502 or off the processors. A number of software modules and data tables may reside in the medium 1520 and/or memory 1504 and be utilized by the one or more processors 1502 in order to manage both communications and the functionality described herein. It should be appreciated that the organization of the contents of the medium 1520 and/or memory 1504 as shown in UE 1500 is merely exemplary, and as such the functionality of the modules and/or data structures may be combined, separated, and/or be structured in different ways depending upon the implementation of the UE 1500.

The medium 1520 and/or memory 1504 may include a positioning session module 1522 that when implemented by the one or more processors 1502 configures the one or more processors 1502 to engage in a positioning session with a location server through a serving base station, via the wireless transceiver 1510, including receiving a request for capability information and sending a response for capability information, receiving assistance data, receiving a request to provide location information, performing positioning measurements by receiving and measuring DL reference signals, transmitting UL references signals, estimating a position, sending a provide location information response, which may include positioning measurements and/or a position estimate.

The medium 1520 and/or memory 1504 may include a resource module 1524 that when implemented by the one or more processors 1502 configures the one or more processors 1502 to select resources to be used for receiving and processing PRS. For example, during acquisition mode, the one or more processors 1502 may be configured to initialize the set of resources that will be used for processing the PRS for each beam based on a fraction of the full set of resources available. For example, the one or more processors 1502 may be configured to tune the receiver 1514 to receive a fraction of the full bandwidth of the PRS while in acquisition mode, and to tune the receiver 1514 to the full bandwidth of the PRS while in tracking mode. In another example, during acquisition mode, the one or more processors 1502 may be configured to initialize the set of resources that will be used for processing the PRS for each beam based on a fraction or reduced number of repetitions of the PRS. For example, the one or more processors 1502 may be configured to receive and integrate over less than the full number of repetitions of the PRS while in acquisition mode, and to receive and integrate over the full number of repetitions of the PRS while in tracking mode. The one or more processors 1502 may be configured to increase or decrease the fraction of the full set of resources used to process PRS in subsequent positioning occasions, e.g., if less than or more than a predetermined number of beams have signal strength metrics that meet a requisite threshold. During tracking mode, the one or more processors 1502 may be configured to use the full set of resources for the PRS for selected beams.

The medium 1520 and/or memory 1504 may include a signal strength module 1526 that when implemented by the one or more processors 1502 configures the one or more processors 1502 to determine a signal strength metric for the PRS received in each beam, e.g., during acquisition mode or tracking mode. The signal strength metrics, for example, may be SNR, RSRP, RSRQ, or other types of measurements. While in acquisition mode, the one or more processors 1502 may be configured to compare the signal strength metrics to predetermined thresholds to determine if the PRS received from each beam exceeds the threshold. In tracking mode, the one or more processors 1502 may be configured to compare the signal strength metrics to signal strength metrics generated in one or more previous positioning occasions, e.g., the immediately preceding positioning occasion, the first positioning occasion of the tracking mode, or an average or combination of signal strength metrics from a plurality of proceeding positioning occasions.

The medium 1520 and/or memory 1504 may include a beam selection module 1528 that when implemented by the one or more processors 1502 configures the one or more processors 1502 to select a predetermined number of best beams for PRS based on the comparison of the signal strength metrics to the corresponding thresholds during the acquisition mode. The predetermined number of beams may be based on the type of positioning measurement being performed, e.g., timing based, which may use multiple beams, or angle based, which may use a single beam. The one or more processors 1502 may be configured to determined when fewer or a greater number than the predetermined number of beams may be selected, which may prompt an increase or decrease in the resources used to process the PRS. The one or more processors 1502 may be further configured to determine when the selection of beams from a previous acquisition mode may no longer be valid, e.g., after operating in tracking mode for a predetermined number of positioning occasions or when the difference between the signal strength metrics between positioning occasions in the tracking mode is greater than a threshold, and prompting a return to the acquisition mode.

The medium 1520 and/or memory 1504 may include a tracking module 1530 that when implemented by the one or more processors 1502 configures the one or more processors 1502 to operate in tracking mode in which PRS from a selected number of beams are processed using the full resources for the PRS and positioning measurements are performed.

The methodologies described herein may be implemented by various means depending upon the application. For example, these methodologies may be implemented in hardware, firmware, software, or any combination thereof. For a hardware implementation, the one or more processors 1502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1520 or memory 1504 that is connected to and executed by the one or more processors 1502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1508 on a non-transitory computer readable medium, such as medium 1520 and/or memory 1504. Examples include computer readable media encoded with a data structure and computer readable media encoded with a computer program 1508. For example, the non-transitory computer readable medium including program code 1508 stored thereon may include program code 1508 to support positioning using array gain distribution variation as a function of angle and frequency in a manner consistent with disclosed embodiments. Non-transitory computer readable medium 1520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1520, instructions and/or data may be provided as signals on transmission media included in a communication apparatus. For example, a communication apparatus may include a transceiver 1510 having signals indicative of instructions and data. The instructions and data are configured to cause one or more processors to implement the functions outlined in the claims. That is, the communication apparatus includes transmission media with signals indicative of information to perform disclosed functions.

Memory 1504 may represent any data storage mechanism. Memory 1504 may include, for example, a primary memory and/or a secondary memory. Primary memory may include, for example, a random access memory, read only memory, etc. While illustrated in this example as being separate from one or more processors 1502, it should be understood that all or part of a primary memory may be provided within or otherwise co-located/coupled with the one or more processors 1502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1520. As such, in certain example implementations, the methods and/or apparatuses presented herein may take the form in whole or part of a computer readable medium 1520 that may include computer implementable code 1508 stored thereon, which if executed by one or more processors 1502 may be operatively enabled to perform all or portions of the example operations as described herein. Computer readable medium 1520 may be a part of memory 1504.

Figure 16:
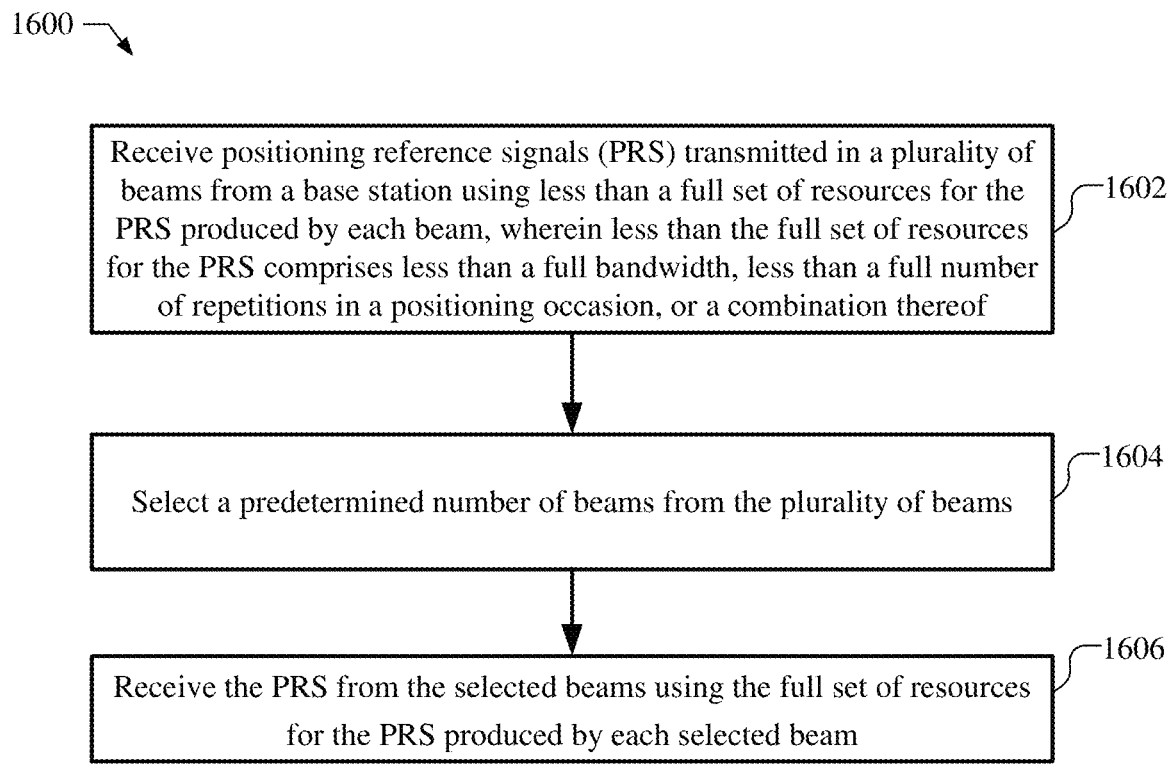
FIG. 16 illustrates a flowchart of an exemplary method for supporting positioning of a mobile device in a wireless network.

FIG. 16 shows a flowchart for an exemplary method 1600 for supporting positioning of a mobile device in a wireless network performed by the mobile device, such as UE 104, in a manner consistent with disclosed implementation.

At block 1602, the mobile device receives positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof, e.g., as discussed at blocks 904 and 906 of FIG. 9 and FIGS. 11A, 11B, 12, and 13. A means for receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof may include, e.g., the wireless transceiver 1510 and one or more processors 1502 with dedicated hardware or implementing executable code or software instructions in memory 1504 and/or medium 1520 such as the positioning session module 1522, and the resource module 1524 in UE 1500 shown in FIG. 15.

At block 1604, the mobile device selects a predetermined number of beams from the plurality of beams, e.g., as discussed at blocks 906 and 908 of FIG. 9 and FIGS. 11A, 11B, 12, and 13. A means for selecting a predetermined number of beams from the plurality of beams may include, e.g., the one or more processors 1502 with dedicated hardware or implementing executable code or software instructions in memory 1504 and/or medium 1520 such as the signal strength module 1526, and the beam selection module 1528 in UE 1500 shown in FIG. 15.

At block 1606, the mobile device receives the PRS from the selected beams using the full set of resources for the PRS produced by each selected beam, e.g., as discussed at blocks 920 and 922 of FIG. 9 and FIGS. 11A, 11B, 12, and 13. A means for receiving the PRS from the selected beams using the full set of resources for the PRS produced by each selected beam may include, e.g., the wireless transceiver 1510 and one or more processors 1502 with dedicated hardware or implementing executable code or software instructions in memory 1504 and/or medium 1520 such as the positioning session module 1522, the resource module 1524, and the receiving module 1530 in UE 1500 shown in FIG. 15.

In one implementation, the mobile device may perform positioning of the mobile device using the received PRS from the selected beams, e.g., as discussed at block 922 of FIG. 9 and FIGS. 11A, 11B, 12, and 13. A means for performing positioning of the mobile device using the received PRS from the selected beams may include, e.g., the wireless transceiver 1510 and one or more processors 1502 with dedicated hardware or implementing executable code or software instructions in memory 1504 and/or medium 1520 such as the positioning session module 1522 and the receiving module 1530 in UE 1500 shown in FIG. 15.

In one implementation, the mobile device may receive the PRS using less than the full set of resources for the PRS produced by each beam by selecting a fraction of the full bandwidth and tuning to receive radio signals on the fraction of the full bandwidth, and may receive the PRS from the selected beams using the full set of resources for the PRS produced by each selected beam by tuning to receive radio signals on the full bandwidth, e.g., as discussed at blocks 904 and 906 of FIG. 9.

In one implementation, the mobile device may receive the PRS using less than the full set of resources for the PRS produced by each beam by selecting a fraction of the full number of repetitions for the PRS and integrating over only the fraction of the full number of repetitions to receive the PRS, and may receive the PRS from the selected beams using the full set of resources for the PRS produced by each selected beam by integrating over the full number of repetitions to receive the PRS, e.g., as discussed at blocks 904 and 906 of FIG. 9.

In one implementation, the mobile device may select the predetermined number of beams by determining at least one signal strength metric for each beam in the plurality of beams, e.g., as discussed at block 906 of FIG. 9. The mobile device may compare the at least one signal strength metric to a corresponding at least one predetermined threshold, e.g., as discussed at block 908 of FIG. 9. The mobile device may select the predetermined number of beams based on the comparison of the at least one signal strength metric to the corresponding at least one predetermined threshold, e.g., as discussed at blocks 908 and 910 of FIG. 9. For example, the at least one signal strength metric comprises Signal to Noise Ratio (SNR), Reference Signal Received Power (RSRP), or Reference Signal Received Quality (RSRQ). A means for selecting the predetermined number of beams by determining at least one signal strength metric for each beam in the plurality of beams, a means for comparing the at least one signal strength metric to a corresponding at least one predetermined threshold, and a means for selecting the predetermined number of beams based on the comparison of the at least one signal strength metric to the corresponding at least one predetermined threshold may include, e.g., the one or more processors 1502 with dedicated hardware or implementing executable code or software instructions in memory 1504 and/or medium 1520 such as the signal strength module 1526, and the beam selection module 1528 in UE 1500 shown in FIG. 15.

In one implementation, the mobile device may select the predetermined number of beams based on at least one signal strength metric of each beam by selecting at least one of a fraction of the full bandwidth or a fraction of the full number of repetitions to receive the PRS, e.g., as discussed at block 904 of FIG. 9. The mobile device may determine whether the at least one signal strength metric exceeds a corresponding at least one predetermined threshold, e.g., as discussed at blocks 906 and 908 of FIG. 9. The mobile device may increase the at least one of the fraction of the full bandwidth or the fraction of the full number of repetitions to receive the PRS when the at least one signal strength metric does not exceed the corresponding at least one predetermined threshold for the predetermined number of beams, e.g., as discussed at block 912 of FIG. 9. For example, the mobile device may iteratively increase the at least one of the fraction of the full bandwidth or the fraction of the full number of repetitions to receive the PRS and determining whether the at least one signal strength metric exceeds the corresponding at least one predetermined threshold until the at least one signal strength metric exceeds the corresponding at least one predetermined threshold for the predetermined number of beams. A means for selecting at least one of a fraction of the full bandwidth or a fraction of the full number of repetitions to receive the PRS, a means for determining whether the at least one signal strength metric exceeds a corresponding at least one predetermined threshold, and a means for increasing the at least one of the fraction of the full bandwidth or the fraction of the full number of repetitions to receive the PRS when the at least one signal strength metric does not exceed the corresponding at least one predetermined threshold for the predetermined number of beams may include, e.g., the wireless transceiver 1510 and one or more processors 1502 with dedicated hardware or implementing executable code or software instructions in memory 1504 and/or medium 1520 such as the signal strength module 1526, and the beam selection module 1528 and the resource module 1524 in UE 1500 shown in FIG. 15.

In one implementation, the mobile device may select the predetermined number of beams based on at least one signal strength metric of each beam by selecting at least one of a fraction of the full bandwidth or a fraction of the full number of repetitions to receive the PRS, e.g., as discussed at block 904 of FIG. 9. The mobile device may determine whether the at least one signal strength metric exceeds a corresponding at least one predetermined threshold, e.g., as discussed at blocks 906 and 908 of FIG. 9. The mobile device may select the predetermined number of beams for receiving when the at least one signal strength metric exceeds the corresponding at least one predetermined threshold for more than the predetermined number of beams, e.g., as discussed at block 908 and 910 of FIG. 9. The mobile device may decrease the at least one of the fraction of the full bandwidth or the fraction of the full number of repetitions to receive the PRS in a subsequent positioning occasion. A means for selecting at least one of a fraction of the full bandwidth or a fraction of the full number of repetitions to receive the PRS, a means for determining whether the at least one signal strength metric exceeds a corresponding at least one predetermined threshold, and a means for selecting the predetermined number of beams for receiving when the at least one signal strength metric exceeds the corresponding at least one predetermined threshold for more than the predetermined number of beams may include, e.g., the wireless transceiver 1510 and one or more processors 1502 with dedicated hardware or implementing executable code or software instructions in memory 1504 and/or medium 1520 such as the signal strength module 1526, and the beam selection module 1528 and the resource module 1524 in UE 1500 shown in FIG. 15.

In one embodiment, the mobile device may receive the PRS from the selected beams using the full set of resources for the PRS produce by each selected beam for multiple positioning occasions, e.g., as discussed at blocks 920 and 922 of FIG. 9 and FIGS. 11A, 11B, 12, and 13. The mobile device may determine a difference in at least one signal strength metric between two positioning occasions for one or more selected beams is below a predetermined threshold, e.g., as discussed at block 922 of FIG. 9. The mobile device may receive the PRS transmitted in the plurality of beams using less than the full set of resources for the PRS produced by each beam after determining the difference is below the predetermined threshold, e.g., as discussed at blocks 922 and 902 of FIG. 9 and FIGS. 11A, 11B, 12, and 13. A means for receiving the PRS from the selected beams using the full set of resources for the PRS produce by each selected beam for multiple positioning occasions may include, e.g., the wireless transceiver 1510 and one or more processors 1502 with dedicated hardware or implementing executable code or software instructions in memory 1504 and/or medium 1520 such as the positioning session module 1522, the resource module 1524, and the receiving module 1530 in UE 1500 shown in FIG. 15. A means for determining a difference in at least one signal strength metric between two positioning occasions for one or more selected beams is below a predetermined threshold may include, e.g., the one or more processors 1502 with dedicated hardware or implementing executable code or software instructions in memory 1504 and/or medium 1520 such as the positioning session module 1522, the signal strength module 1526, and the beam selection module 1528 in UE 1500 shown in FIG. 15. A means for receiving the PRS transmitted in the plurality of beams using less than the full set of resources for the PRS produced by each beam after determining the difference is below the predetermined threshold may include, e.g., the wireless transceiver 1510 and one or more processors 1502 with dedicated hardware or implementing executable code or software instructions in memory 1504 and/or medium 1520 such as the positioning session module 1522, the resource module 1524, and the beam selection module 1528 in UE 1500 shown in FIG. 15.

In one embodiment, the mobile device may receive the PRS from the selected beams using the full set of resources for the PRS produce by each selected beam for multiple positioning occasions, e.g., as discussed at blocks 920 and 922 of FIG. 9 and FIGS. 11A, 11B, 12, and 13. The mobile device may receive the PRS transmitted in the plurality of beams using less than the full set of resources for the PRS produced by each beam after the predetermined number of positioning occasions, e.g., as discussed at blocks 922 and 902 of FIG. 9 and FIGS. 11A, 11B, 12, and 13. A means for receiving the PRS from the selected beams using the full set of resources for the PRS produce by each selected beam for a predetermined number of positioning occasions may include, e.g., the wireless transceiver 1510 and one or more processors 1502 with dedicated hardware or implementing executable code or software instructions in memory 1504 and/or medium 1520 such as the positioning session module 1522, the resource module 1524, and the receiving module 1530 in UE 1500 shown in FIG. 15. A means for receiving the PRS transmitted in the plurality of beams using less than the full set of resources for the PRS produced by each beam after the predetermined number of positioning occasions may include, e.g., the wireless transceiver 1510 and one or more processors 1502 with dedicated hardware or implementing executable code or software instructions in memory 1504 and/or medium 1520 such as the positioning session module 1522, the resource module 1524, and the beam selection module 1526 in UE 1500 shown in FIG. 15.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting positioning of a mobile device in a wireless network performed by the mobile device, the method comprising:
receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;
selecting a predetermined number of beams from the plurality of beams; and
receiving the PRS from the selected beams using the full set of resources for the PRS produced by each selected beam.

2. The method of clause 1, further comprising performing positioning of the mobile device using the received PRS from the selected beams.

3. The method of either of clauses 1 or 2, wherein receiving the PRS using less than the full set of resources for the PRS produced by each beam comprises selecting a fraction of the full bandwidth and tuning to receive radio signals on the fraction of the full bandwidth, and wherein receiving the PRS from the selected beams using the full set of resources for the PRS produced by each selected beam comprises tuning to receive radio signals on the full bandwidth.

4. The method of any of clauses 1-3, wherein receiving the PRS using less than the full set of resources for the PRS produced by each beam comprises selecting a fraction of the full number of repetitions for the PRS and integrating over only the fraction of the full number of repetitions to receive the PRS, and wherein receiving the PRS from the selected beams using the full set of resources for the PRS produced by each selected beam comprises integrating over the full number of repetitions to receive the PRS.

5. The method of any of clauses 1-4, wherein selecting the predetermined number of beams comprises:
determining at least one signal strength metric for each beam in the plurality of beams;
comparing the at least one signal strength metric to a corresponding at least one predetermined threshold; and
selecting the predetermined number of beams based on the comparison of the at least one signal strength metric to the corresponding at least one predetermined threshold.

6. The method of clause 5, wherein the at least one signal strength metric comprises Signal to Noise Ratio (SNR), Reference Signal Received Power (RSRP), or Reference Signal Received Quality (RSRQ).

7. The method of any of clauses 1-6, wherein the predetermined number of beams are selected based on at least one signal strength metric of each beam, and wherein the method further comprises:
selecting at least one of a fraction of the full bandwidth or a fraction of the full number of repetitions to receive the PRS;
determining whether the at least one signal strength metric exceeds a corresponding at least one predetermined threshold; and
increasing the at least one of the fraction of the full bandwidth or the fraction of the full number of repetitions to receive the PRS when the at least one signal strength metric does not exceed the corresponding at least one predetermined threshold for the predetermined number of beams.

8. The method of clause 7, further comprising iteratively increasing the at least one of the fraction of the full bandwidth or the fraction of the full number of repetitions to receive the PRS and determining whether the at least one signal strength metric exceeds the corresponding at least one predetermined threshold until the at least one signal strength metric exceeds the corresponding at least one predetermined threshold for the predetermined number of beams.

9. The method of any of clauses 1-6, wherein the predetermined number of beams are selected based on at least one signal strength metric of each beam, and wherein the method further comprises:
selecting at least one of a fraction of the full bandwidth or a fraction of the full number of repetitions to receive the PRS;
determining whether the at least one signal strength metric exceeds a corresponding at least one predetermined threshold; and selecting the predetermined number of beams for receiving when the at least one signal strength metric exceeds the corresponding at least one predetermined threshold for more than the predetermined number of beams.

10. The method of clause 9, the method further comprising decreasing the at least one of the fraction of the full bandwidth or the fraction of the full number of repetitions to receive the PRS in a subsequent positioning occasion.

11. The method of any of clauses 1-10, further comprising:

receiving the PRS from the selected beams using the full set of resources for the PRS produce by each selected beam for multiple positioning occasions;

determining a difference in at least one signal strength metric between two positioning occasions for one or more selected beams is below a predetermined threshold; and receiving the PRS transmitted in the plurality of beams using less than the full set of resources for the PRS produced by each beam after determining the difference is below the predetermined threshold.

12. The method of any of clauses 1-10, further comprising:

receiving the PRS from the selected beams using the full set of resources for the PRS produce by each selected beam for a predetermined number of positioning occasions; and receiving the PRS transmitted in the plurality of beams using less than the full set of resources for the PRS produced by each beam after the predetermined number of positioning occasions.

13. A mobile device configured for supporting positioning of the mobile device in a wireless network, comprising:

a wireless transceiver configured to wirelessly communicate in the wireless network;

at least one memory;

at least one processor coupled to the wireless transceiver and the at least one memory, wherein the at least one processor is configured to:

receive, using the wireless transceiver, positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;

select a predetermined number of beams from the plurality of beams; and receive, using the wireless transceiver, the PRS from the selected beams using the full set of resources for the PRS produced by each selected beam.

14. The mobile device of clause 13, wherein the at least one processor is further configured to perform positioning of the mobile device using the received PRS from the selected beams.

15. The mobile device of any of clauses 13 or 14, wherein the at least one processor is configured to receive the PRS using less than the full set of resources for the PRS produced by each beam by being configured to select a fraction of the full bandwidth and tune the wireless transceiver to receive radio signals on the fraction of the full bandwidth, and wherein the at least one processor is configured to receive the PRS from the selected beams using the full set of resources for the PRS produced by each selected beam by being configured to tune the wireless transceiver to receive radio signals on the full bandwidth.

16. The mobile device of any of clauses 13-15, wherein the at least one processor is configured to receive the PRS using less than the full set of resources for the PRS produced by each beam by being configured to select a fraction of the full number of repetitions for the PRS and integrate over only the fraction of the full number of repetitions to receive the PRS, and wherein the at least one processor is configured to receive the PRS from the selected beams using the full set of resources for the PRS produced by each selected beam by being configured to integrate over the full number of repetitions to receive the PRS.

17. The mobile device of any of clauses 13-16, wherein the at least one processor is configured to select the predetermined number of beams by being configured to:

determine at least one signal strength metric for each beam in the plurality of beams;

compare the at least one signal strength metric to a corresponding at least one predetermined threshold; and select the predetermined number of beams based on the comparison of the at least one signal strength metric to the corresponding at least one predetermined threshold.

18. The mobile device of clause 17, wherein the at least one signal strength metric comprises Signal to Noise Ratio (SNR), Reference Signal Received Power (RSRP), or Reference Signal Received Quality (RSRQ).

19. The mobile device of any of clauses 13-18, wherein the predetermined number of beams are selected based on at least one signal strength metric of each beam, and wherein the at least one processor is further configured to:

select at least one of a fraction of the full bandwidth or a fraction of the full number of repetitions to receive the PRS;

determine whether the at least one signal strength metric exceeds a corresponding at least one predetermined threshold; and increase the at least one of the fraction of the full bandwidth or the fraction of the full number of repetitions to receive the PRS when the at least one signal strength metric does not exceed the corresponding at least one predetermined threshold for the predetermined number of beams.

20. The mobile device of clause 19, wherein the at least one processor is further configured to iteratively increase the at least one of the fraction of the full bandwidth or the fraction of the full number of repetitions to receive the PRS and determine whether the at least one signal strength metric exceeds the corresponding at least one predetermined threshold until the at least one signal strength metric exceeds the corresponding at least one predetermined threshold for the predetermined number of beams.

21. The mobile device of any of clauses 13-18, wherein the predetermined number of beams are selected based on at least one signal strength metric of each beam, and wherein the at least one processor is further configured to:

select at least one of a fraction of the full bandwidth or a fraction of the full number of repetitions to receive the PRS;

determine whether the at least one signal strength metric exceeds a corresponding at least one predetermined threshold; and select the predetermined number of beams for receiving when the at least one signal strength metric exceeds the corresponding at least one predetermined threshold for more than the predetermined number of beams.

22. The mobile device of clause 21, wherein the at least one processor is further configured to decrease the at least one of the fraction of the full bandwidth or the fraction of the full number of repetitions to receive the PRS in a subsequent positioning occasion.

23. The mobile device of any of clauses 13-22, wherein the at least one processor is further configured to:
receive, using the wireless transceiver, the PRS from the selected beams using the full set of resources for the PRS produce by each selected beam for multiple positioning occasions;
determine a difference in at least one signal strength metric between two positioning occasions for one or more selected beams is below a predetermined threshold; and
receive, using the wireless transceiver, the PRS transmitted in the plurality of beams using less than the full set of resources for the PRS produced by each beam after determining the difference is below the predetermined threshold.

24. The mobile device of any of clauses 13-22, wherein the at least one processor is further configured to:
receive, using the wireless transceiver, the PRS from the selected beams using the full set of resources for the PRS produce by each selected beam for a predetermined number of positioning occasions; and
receive, using the wireless transceiver, the PRS transmitted in the plurality of beams using less than the full set of resources for the PRS produced by each beam after the predetermined number of positioning occasions.

25. A mobile device configured for supporting positioning of the mobile device in a wireless network, comprising:
means for receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;
means for selecting a predetermined number of beams from the plurality of beams; and
means for receiving the PRS from the selected beams using the full set of resources for the PRS produced by each selected beam.

26. The mobile device of clause 25, wherein the means for receiving the PRS using less than the full set of resources for the PRS produced by each beam comprises a means for selecting a fraction of the full bandwidth and means for tuning to receive radio signals on the fraction of the full bandwidth, and wherein the means for receiving the PRS from the selected beams using the full set of resources for the PRS produced by each selected beam comprises means for tuning to receive radio signals on the full bandwidth.

27. The mobile device of either of clauses 25 or 26, wherein the means for receiving the PRS using less than the full set of resources for the PRS produced by each beam comprises means for selecting a fraction of the full number of repetitions for the PRS and means for integrating over only the fraction of the full number of repetitions to receive the PRS, and wherein the means for receiving the PRS from the selected beams using the full set of resources for the PRS produced by each selected beam comprises means for integrating over full number of repetitions to receive the PRS.

28. A non-transitory computer readable storage medium including program code stored thereon, the program code is operable to configure at least one processor in a mobile device for supporting positioning of the mobile device in a wireless network, comprising:
program code to receive positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;
program code to select a predetermined number of beams from the plurality of beams; and
program code to receive the PRS from the selected beams using the full set of resources for the PRS produced by each selected beam.

29. The non-transitory computer readable storage medium of clause 28, wherein the program code to receive the PRS using less than the full set of resources for the PRS produced by each beam selects a fraction of the full bandwidth and tunes a wireless transceiver to receive radio signals on the fraction of the full bandwidth, and wherein the program code to receive the PRS from the selected beams using the full set of resources for the PRS produced by each selected beam tunes the wireless transceiver to receive radio signals on the full bandwidth.

30. The non-transitory computer readable storage medium of either of clauses 28 or 29, wherein the program code to receive the PRS using less than the full set of resources for the PRS produced by each beam selects a fraction of the full number of repetitions for the PRS and integrates over only the fraction of the full number of repetitions to receive the PRS, and wherein the program code to receive the PRS from the selected beams using the full set of resources for the PRS produced by each selected beam integrates over full number of repetitions to receive the PRS.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method for supporting positioning of a mobile device in a wireless network performed by the mobile device, the method comprising:
receiving positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;
selecting a predetermined number of beams from the plurality of beams; and
receiving the PRS from the selected beams using the full set of resources for the PRS produced by each selected beam.

2. The method of claim 1, further comprising performing positioning of the mobile device using the received PRS from the selected beams.

3. The method of claim 1, wherein receiving the PRS using less than the full set of resources for the PRS produced by each beam comprises selecting a fraction of the full bandwidth and tuning to receive radio signals on the fraction of the full bandwidth, and wherein receiving the PRS from the selected beams using the full set of resources for the PRS produced by each selected beam comprises tuning to receive radio signals on the full bandwidth.

4. The method of claim 1, wherein receiving the PRS using less than the full set of resources for the PRS produced by each beam comprises selecting a fraction of the full number of repetitions for the PRS and integrating over only the fraction of the full number of repetitions to receive the PRS, and wherein receiving the PRS from the selected beams using the full set of resources for the PRS produced by each selected beam comprises integrating over the full number of repetitions to receive the PRS.

5. The method of claim 1, wherein selecting the predetermined number of beams comprises:
determining at least one signal strength metric for each beam in the plurality of beams;
comparing the at least one signal strength metric to a corresponding at least one predetermined threshold; and
selecting the predetermined number of beams based on the comparison of the at least one signal strength metric to the corresponding at least one predetermined threshold.

6. The method of claim 5, wherein the at least one signal strength metric comprises Signal to Noise Ratio (SNR), Reference Signal Received Power (RSRP), or Reference Signal Received Quality (RSRQ).

7. The method of claim 1, wherein the predetermined number of beams are selected based on at least one signal strength metric of each beam, and wherein the method further comprises:
selecting at least one of a fraction of the full bandwidth or a fraction of the full number of repetitions to receive the PRS;
determining whether the at least one signal strength metric exceeds a corresponding at least one predetermined threshold; and
increasing the at least one of the fraction of the full bandwidth or the fraction of the full number of repetitions to receive the PRS when the at least one signal strength metric does not exceed the corresponding at least one predetermined threshold for the predetermined number of beams.

8. The method of claim 7, further comprising iteratively increasing the at least one of the fraction of the full bandwidth or the fraction of the full number of repetitions to receive the PRS and determining whether the at least one signal strength metric exceeds the corresponding at least one predetermined threshold until the at least one signal strength metric exceeds the corresponding at least one predetermined threshold for the predetermined number of beams.

9. The method of claim 1, wherein the predetermined number of beams are selected based on at least one signal strength metric of each beam, and wherein the method further comprises:
selecting at least one of a fraction of the full bandwidth or a fraction of the full number of repetitions to receive the PRS;
determining whether the at least one signal strength metric exceeds a corresponding at least one predetermined threshold; and
selecting the predetermined number of beams for receiving when the at least one signal strength metric exceeds the corresponding at least one predetermined threshold for more than the predetermined number of beams.

10. The method of claim 9, the method further comprising decreasing the at least one of the fraction of the full bandwidth or the fraction of the full number of repetitions to receive the PRS in a subsequent positioning occasion.

11. The method of claim 1, further comprising:
receiving the PRS from the selected beams using the full set of resources for the PRS produce by each selected beam for multiple positioning occasions;
determining a difference in at least one signal strength metric between two positioning occasions for one or more selected beams is below a predetermined threshold; and
receiving the PRS transmitted in the plurality of beams using less than the full set of resources for the PRS produced by each beam after determining the difference is below the predetermined threshold.

12. The method of claim 1, further comprising:
receiving the PRS from the selected beams using the full set of resources for the PRS produce by each selected beam for a predetermined number of positioning occasions; and
receiving the PRS transmitted in the plurality of beams using less than the full set of resources for the PRS produced by each beam after the predetermined number of positioning occasions.

13. A mobile device configured for supporting positioning of the mobile device in a wireless network, comprising:
a wireless transceiver configured to wirelessly communicate in the wireless network;
at least one memory;
at least one processor coupled to the wireless transceiver and the at least one memory, wherein the at least one processor is configured to:
receive, using the wireless transceiver, positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;
select a predetermined number of beams from the plurality of beams; and
receive, using the wireless transceiver, the PRS from the selected beams using the full set of resources for the PRS produced by each selected beam.

14. The mobile device of claim 13, wherein the at least one processor is further configured to perform positioning of the mobile device using the received PRS from the selected beams.

15. The mobile device of claim 13, wherein the at least one processor is configured to receive the PRS using less than the full set of resources for the PRS produced by each beam by being configured to select a fraction of the full bandwidth and tune the wireless transceiver to receive radio signals on the fraction of the full bandwidth, and wherein the at least one processor is configured to receive the PRS from the selected beams using the full set of resources for the PRS produced by each selected beam by being configured to tune the wireless transceiver to receive radio signals on the full bandwidth.

16. The mobile device of claim 13, wherein the at least one processor is configured to receive the PRS using less than the full set of resources for the PRS produced by each beam by being configured to select a fraction of the full number of repetitions for the PRS and integrate over only the fraction of the full number of repetitions to receive the PRS, and wherein the at least one processor is configured to receive the PRS from the selected beams using the full set of resources for the PRS produced by each selected beam by being configured to integrate over the full number of repetitions to receive the PRS.

17. The mobile device of claim 13, wherein the at least one processor is configured to select the predetermined number of beams by being configured to:

determine at least one signal strength metric for each beam in the plurality of beams;

compare the at least one signal strength metric to a corresponding at least one predetermined threshold; and select the predetermined number of beams based on the comparison of the at least one signal strength metric to the corresponding at least one predetermined threshold.

18. The mobile device of claim 17, wherein the at least one signal strength metric comprises Signal to Noise Ratio (SNR), Reference Signal Received Power (RSRP), or Reference Signal Received Quality (RSRQ).

19. The mobile device of claim 13, wherein the predetermined number of beams are selected based on at least one signal strength metric of each beam, and wherein the at least one processor is further configured to:

select at least one of a fraction of the full bandwidth or a fraction of the full number of repetitions to receive the PRS;

determine whether the at least one signal strength metric exceeds a corresponding at least one predetermined threshold; and increase the at least one of the fraction of the full bandwidth or the fraction of the full number of repetitions to receive the PRS when the at least one signal strength metric does not exceed the corresponding at least one predetermined threshold for the predetermined number of beams.

20. The mobile device of claim 19, wherein the at least one processor is further configured to iteratively increase the at least one of the fraction of the full bandwidth or the fraction of the full number of repetitions to receive the PRS and determine whether the at least one signal strength metric exceeds the corresponding at least one predetermined threshold until the at least one signal strength metric exceeds the corresponding at least one predetermined threshold for the predetermined number of beams.

21. The mobile device of claim 13, wherein the predetermined number of beams are selected based on at least one signal strength metric of each beam, and wherein the at least one processor is further configured to:

select at least one of a fraction of the full bandwidth or a fraction of the full number of repetitions to receive the PRS;

determine whether the at least one signal strength metric exceeds a corresponding at least one predetermined threshold; and select the predetermined number of beams for receiving when the at least one signal strength metric exceeds the corresponding at least one predetermined threshold for more than the predetermined number of beams.

22. The mobile device of claim 21, wherein the at least one processor is further configured to decrease the at least one of the fraction of the full bandwidth or the fraction of the full number of repetitions to receive the PRS in a subsequent positioning occasion.

23. The mobile device of claim 13, wherein the at least one processor is further configured to:

receive, using the wireless transceiver, the PRS from the selected beams using the full set of resources for the PRS produce by each selected beam for multiple positioning occasions;

determine a difference in at least one signal strength metric between two positioning occasions for one or more selected beams is below a predetermined threshold; and receive, using the wireless transceiver, the PRS transmitted in the plurality of beams using less than the full set of resources for the PRS produced by each beam after determining the difference is below the predetermined threshold.

24. The mobile device of claim 13, wherein the at least one processor is further configured to:

receive, using the wireless transceiver, the PRS from the selected beams using the full set of resources for the PRS produce by each selected beam for a predetermined number of positioning occasions; and receive, using the wireless transceiver, the PRS transmitted in the plurality of beams using less than the full set of resources for the PRS produced by each beam after the predetermined number of positioning occasions.

25. A mobile device configured for supporting positioning of the mobile device in a wireless network, comprising:

means for acquiring positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;

means for selecting a predetermined number of beams from the plurality of beams; and means for receiving the PRS from the selected beams using the full set of resources for the PRS produced by each selected beam.

26. The mobile device of claim 25, wherein the means for acquiring the PRS using less than the full set of resources for the PRS produced by each beam comprises a means for selecting a fraction of the full bandwidth and means for tuning to receive radio signals on the fraction of the full bandwidth, and wherein the means for receiving the PRS from the selected beams using the full set of resources for the PRS produced by each selected beam comprises means for tuning to receive radio signals on the full bandwidth.

27. The mobile device of claim 25, wherein the means for acquiring the PRS using less than the full set of resources for the PRS produced by each beam comprises means for selecting a fraction of the full number of repetitions for the PRS and means for integrating over only the fraction of the full number of repetitions to receive the PRS, and wherein the means for receiving the PRS from the selected beams using the full set of resources for the PRS produced by each selected beam comprises means for integrating over full number of repetitions to receive the PRS.

28. A non-transitory computer readable storage medium including program code stored thereon, the program code is operable to configure at least one processor in a mobile device for supporting positioning of the mobile device in a wireless network, comprising:

program code to receive positioning reference signals (PRS) transmitted in a plurality of beams from a base station using less than a full set of resources for the PRS produced by each beam, wherein less than the full set of resources for the PRS comprises less than a full bandwidth, less than a full number of repetitions in a positioning occasion, or a combination thereof;

program code to select a predetermined number of beams from the plurality of beams; and program code to receive the PRS from the selected beams using the full set of resources for the PRS produced by each selected beam.

29. The non-transitory computer readable storage medium of claim 28, wherein the program code to receive the PRS using less than the full set of resources for the PRS produced by each beam selects a fraction of the full bandwidth and tunes a wireless transceiver to receive radio signals on the fraction of the full bandwidth, and wherein the program code to receive the PRS from the selected beams using the full set of resources for the PRS produced by each selected beam tunes the wireless transceiver to receive radio signals on the full bandwidth.

30. The non-transitory computer readable storage medium of claim 28, wherein the program code to receive the PRS using less than the full set of resources for the PRS produced by each beam selects a fraction of the full number of repetitions for the PRS and integrates over only the fraction of the full number of repetitions to receive the PRS, and wherein the program code to receive the PRS from the selected beams using the full set of resources for the PRS produced by each selected beam integrates over full number of repetitions to receive the PRS.

\* \* \* \* \*